United States Patent
Colena et al.

(10) Patent No.: US 11,876,728 B2
(45) Date of Patent: Jan. 16, 2024

(54) USING CONSTRAINT PROGRAMMING TO SET RESOURCE ALLOCATION LIMITATIONS FOR ALLOCATING RESOURCES TO CONSUMERS

(71) Applicant: Oracle International Corporation, Redwood Shores, CA (US)

(72) Inventors: Michael Patrick Colena, Hollis, NH (US); Joshua Deen Griffin, Wexford, PA (US); Gao Chen, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/068,662

(22) Filed: Dec. 20, 2022

(65) Prior Publication Data

US 2023/0122015 A1 Apr. 20, 2023

Related U.S. Application Data

(63) Continuation of application No. 17/302,657, filed on May 10, 2021, now Pat. No. 11,539,635.

(51) Int. Cl.
*H04L 47/724* (2022.01)
*H04L 47/762* (2022.01)
*H04L 47/783* (2022.01)
*H04L 9/40* (2022.01)

(52) U.S. Cl.
CPC .......... *H04L 47/724* (2013.01); *H04L 47/762* (2013.01); *H04L 47/783* (2013.01); *H04L 63/1433* (2013.01)

(58) Field of Classification Search
CPC ................. H04L 47/724; H04L 47/762; H04L 47/783; H04L 63/1433
See application file for complete search history.

(56) References Cited

U.S. PATENT DOCUMENTS

| | | | |
|---|---|---|---|
| 9,378,056 | B2 | 6/2016 | Oda et al. |
| 11,188,391 | B1 | 11/2021 | Sule |
| 11,360,821 | B1 | 6/2022 | Dey et al. |

(Continued)

OTHER PUBLICATIONS

"Oracle Advanced Constraint Technology," R&D Group, pp. 1-2, Retreived on Nov. 17, 2021.

(Continued)

*Primary Examiner* — Duc C Ho
(74) *Attorney, Agent, or Firm* — Invoke

(57) ABSTRACT

Resource allocation limitations include resource limits and resource guarantees. A consumer is vulnerable to interruption by other consumers if using more resources than guaranteed. Resources are designated and/or assigned consumers based on resource limits and resource guarantees. A constraint programming (CP) solver determines resource limits and resource guarantees that minimize vulnerability and/or vulnerability cost based on resource usage data. A CP data model includes limit elements, guarantee elements, and vulnerability elements. The CP data model further includes guarantee-vulnerability constraints, which relies on exceedance distributions generated from resource usage data for the consumers. The CP data model declaratively expresses combinatorial properties of a problem in terms of constraints. CP is a form of declarative programming.

20 Claims, 10 Drawing Sheets

(56) References Cited

U.S. PATENT DOCUMENTS

| | | | |
|---|---|---|---|
| 2005/0132362 | A1 | 6/2005 | Knauerhase et al. |
| 2006/0277307 | A1 | 12/2006 | Bernardin et al. |
| 2008/0184250 | A1 | 7/2008 | Hamadi et al. |
| 2010/0057518 | A1 | 3/2010 | Naveh et al. |
| 2010/0161373 | A1 | 6/2010 | Connors et al. |
| 2012/0311597 | A1 | 12/2012 | Manula et al. |
| 2013/0111033 | A1 | 5/2013 | Mao et al. |
| 2014/0007097 | A1 | 1/2014 | Chin et al. |
| 2014/0172929 | A1 | 6/2014 | Sedayao et al. |
| 2015/0312169 | A1 | 10/2015 | Klots et al. |
| 2016/0156567 | A1 | 6/2016 | Miyahara et al. |
| 2016/0306678 | A1 | 10/2016 | Hira et al. |
| 2017/0195410 | A1 | 7/2017 | Sebbah et al. |
| 2017/0220364 | A1 | 8/2017 | Kadioglu et al. |
| 2018/0173605 | A1* | 6/2018 | Kadioglu ............ G06F 11/3672 |
| 2019/0095245 | A1 | 3/2019 | Abes et al. |
| 2020/0034201 | A1 | 1/2020 | Lu et al. |
| 2020/0074412 | A1* | 3/2020 | Colena ..................... G06N 5/01 |
| 2023/0043579 | A1 | 2/2023 | Chitalwala et al. |
| 2023/0205595 | A1 | 6/2023 | Singh et al. |

OTHER PUBLICATIONS

C. Bessiere, "Constraint Propagation," F. Rossi, P. van Beek, T. Walsh (Eds.), Handbook of CP, 2006, pp. 1-63.

D Meier, "Resource Allocation in Clouds," Communication Systems VII, Chapter 1, Stiller, B., et al., eds., University of Zurich, Jun. 2014, pp. 1-57.

F. Rossi, P. van Beek, and T. Walsh, "Handbook of Constraint Programming," Elsevier, 2006, pp. 969.

G. Pesant and M. Gendreau, "A Constraint Programming Framework for Local Search Methods," Journal of Heuristics, vol. 5, 1999, pp. 255-279.

H.N. Van et al., "Autonomic Virtual Resource Management for Service Hosting Platforms," In: ICSE Workshop on Software Engineering Challenges of Cloud Computing, 2009, pp. 1-8.

M. Garcia de la Banda, P. J. Stuckey, P. V. Hentenryck, M. Wallace, "The Future of Optimization Technology," Constraints, vol. 19, Issue 2, 2014, pp. 1-12.

M. Leconte, "A bounds-based reduction scheme for constraints of difference," In Proceedings of the Second International Workshop on Constraint-based Reasoning, 1996, pp. 19-28.

M. Trick, "A Dynamic Programming Approach for Consistency and Propagation for Knapsack Constraints," Annals of Operations Research, vol. 118, 2003, pp. 73-84.

R. Bartak, "Constraint Propagation and Backtracking-based Search," Summer school on CP, 2005. pp. 1-42.

S Heinz and J.C. Beck, "Solving Resource Allocation/Scheduling Problems with Constraint Integer Programming," 2011, pp. 1-10.

Shaw P, "A Constraint for Bin Packing," In: Wallace M. (eds) Principles and Practice of Constraint Programming—CP 2004. CP 2004, Lecture Notes in Computer Science, vol. 3258, Springer, Berlin, Heidelberg, 2004, pp. 648-662.

W Lin, et al, "A Threshold-based Dynamic Resource Allocation Scheme for Cloud Computing," Procedia Engineering, vol. 23, 2011, pp. 695-703.

* cited by examiner

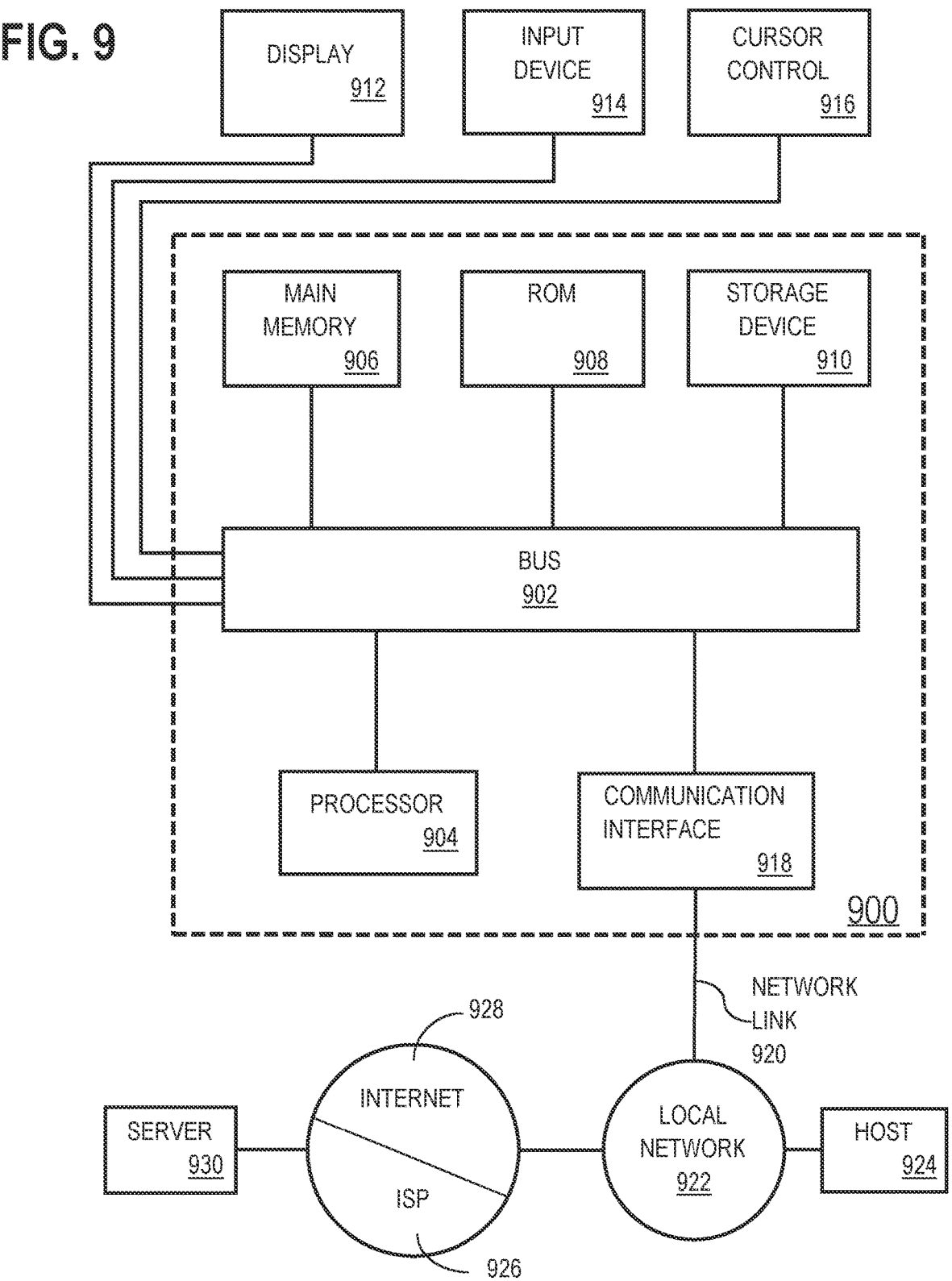

USING CONSTRAINT PROGRAMMING TO SET RESOURCE ALLOCATION LIMITATIONS FOR ALLOCATING RESOURCES TO CONSUMERS

INCORPORATION BY REFERENCE; DISCLAIMER

The following application is hereby incorporated by reference: U.S. Pat. No. 11,539,635. The Applicant hereby rescinds any disclaimer of claim scope in the parent application(s) or the prosecution history thereof and advises the USPTO that the claims in this application may be broader than any claim in the parent application(s).

TECHNICAL FIELD present disclosure relates to the use of constraint programming. In particular, the present disclosure relates to using constraint programming to set resource allocation limitations for allocating resources to consumers in a computing system.

BACKGROUND

A computing system includes a set of resources (for example, central processing units (CPUs)) that are shared amongst a set of consumers (for example, database instances). When one consumer puts large demands on the shared set of resources, the consumer may negatively impact the performance of other consumers.

One way of reducing negative impact amongst consumers sharing a finite set of resources is to enforce resource allocation limitations upon the consumers. However, consumers are associated with different process types, priorities, and/or other attributes. Further, process loads of consumers are dynamically changing. Resource allocation limitations that are set without regard to static attributes and/or dynamic loads of consumers may result in an inefficient allocation of resources. For example, some consumers may strain against the limits while some resources go underutilized.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1:
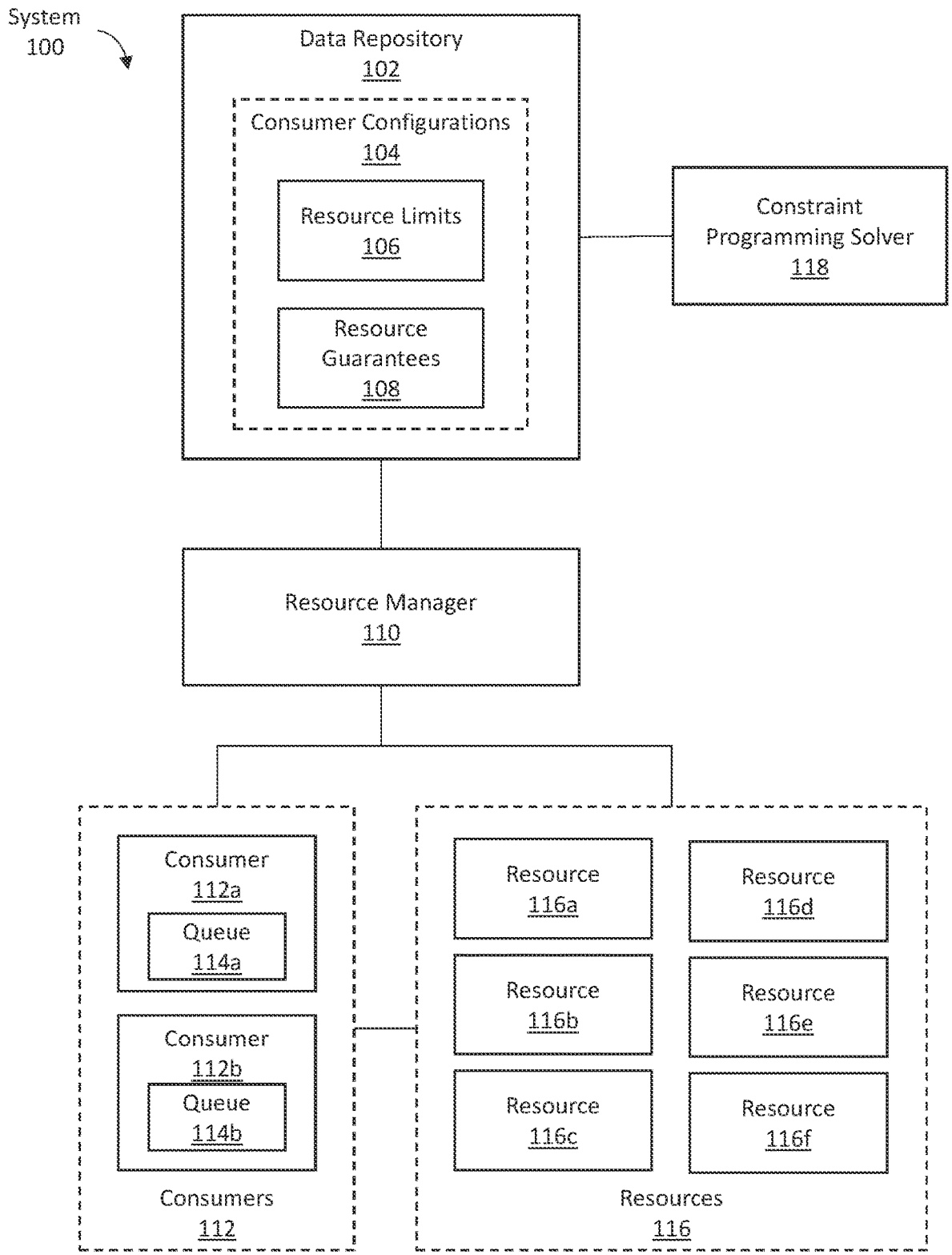
FIG. 1 illustrates a resource manager managing a computing system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. COMPUTING SYSTEM ARCHITECTURE
3. CONSTRAINT PROGRAMMING DATA MODEL AND SEARCH DIRECTIVE GENERATION SYSTEM ARCHITECTURE
4. DETERMINING AND UPDATING RESOURCE ALLOCATION LIMITATIONS
5. GENERATING AND APPLYING A CONSTRAINT PROGRAMMING DATA MODEL AND CONSTRAINT PROGRAMMING SEARCH DIRECTIVE TO A CONSTRAINT PROGRAMMING SOLVER
6. ENFORCING RESOURCE GUARANTEES AND RESOURCE LIMITS
7. HARDWARE OVERVIEW
8. MISCELLANEOUS; EXTENSIONS

1. General Overview

One or more embodiments include setting resource allocation limitations for allocating resources to consumers in a computing system. Resource allocation limitations include a resource limit and a resource guarantee. A resource limit is an upper bound on the number of resources that a particular consumer is permitted to use at a given time. A resource guarantee is a lower bound on the number of resources that a particular consumer is guaranteed to have access to at a given time. A consumer that uses more than its guaranteed resources becomes vulnerable to interruption if resource demands by other consumers suddenly increase. The term "vulnerability" as used herein refers to a consumer's resource usage exceeding the consumer's resource guarantee.

One or more embodiments include using constraint programming (CP) to set resource allocation limitations for allocating resources to consumers in a computing system. CP is a form of declarative programming. CP obtains a solution to a real-world problem based on a specification of a CP data model and, optionally, a CP search directive. In contrast, imperative programming is based on a specification of a sequence of steps.

A CP data model includes a set of data model elements; domains of possible values that can be assigned to each element; and one or more constraints that define combinations of values that are allowed to be assigned to the elements. Based on the CP data model, a set of values for the set of elements that satisfies all constraints is determined. A set of values for the set of elements that satisfies all constraints may be referred to herein as a "CP solution."

A CP search directive guides the assignment of a set of values to a set of data model elements that satisfies all constraints, as specified by a CP data model. The CP search directive results in certain sequences in which values are attempted for assignment to one or more data model elements. Additionally or alternatively, the CP search directive prioritizes the assignment of certain values over other values for one or more data model elements. Different CP search directives for a same CP data model may result in a different CP solution. Additionally or alternatively, different CP search directives 234 for a same CP data model 232 may result in different efficiency levels and/or runtimes for obtaining a CP solution.

One or more embodiments include generating a CP data model for determining resource allocation limitations for allocating resources to consumers in a computing system. The CP data model includes several sets of data model elements. A set of limit elements represents resource limits for the consumers. A set of guarantee elements represents resource guarantees for the consumers. A set of vulnerability elements represents counts (also referred to as "vulnerability counts") of datapoints indicating vulnerability. A particular vulnerability element represents a count of datapoints indicating that a particular consumer was vulnerable, for a given resource guarantee. The count of such datapoints is based on the particular consumer's resource usage data over a given historical time period.

The CP data model further includes several constraints. A limit-guarantee constraint relates the limit elements and the guarantee elements. The limit-guarantee constraint requires that a guarantee element (of a particular consumer) be equal to a limit element (of the particular consumer) divided by an oversubscription ratio, wherein the oversubscription ratio is equal to a sum of the limit elements divided by a total number of resources. A total resources constraint relates the guarantee elements and a total number of resources in the computing system. The total resources constraint requires that a sum of the guarantee elements be less than or equal to a total number of resources. A guarantee-vulnerability constraint relates the guarantee elements and the vulnerability elements. The guarantee-vulnerability constraint requires that a vulnerability element (of a particular consumer) be equal to a vulnerability count corresponding to a guarantee value assigned (or to-be-assigned) to a guarantee element (for the particular consumer), based on resource usage over a historical time period.

In an embodiment, the guarantee-vulnerability constraint is expressed as an element constraint. An element constraint accepts as input (a) an index element, and (b) a sequence of values. The index element serves to index into the sequence of values, such that the element constraint returns a particular value, from the sequence of values, corresponding to a value assigned (or to-be-assigned) to the index element. For the guarantee-vulnerability constraint, the index element is the guarantee element (for a particular consumer), and the sequence of values is an exceedance distribution (for the particular consumer). An exceedance distribution indicates counts of datapoints indicating that resource usage of a particular consumer exceeds critical values, wherein the critical values range from zero to a total number of resources in the computing system. The counts of such datapoints are based on the particular consumer's resource usage data over a given historical time period.

One or more embodiments include generating a CP search directive for determining resource allocation limitations for allocating resources to consumers in a computing system. In an embodiment, a CP search directive includes a minimization objective function associated with vulnerability counts. In an embodiment, a CP search directive is to minimize a maximum of the set of vulnerability elements. In another embodiment, a CP search directive is to minimize an average of a set of vulnerability elements. In another embodiment, a CP search directive is to minimize a sum of the vulnerability elements (that is, to minimize a total vulnerability count for the computing system). In yet another embodiment, a CP search directive includes a minimization objective function associated with vulnerability counts and vulnerability costs, wherein a per-consumer vulnerability cost for a particular consumer is a vulnerability factor for the particular consumer multiplied by a vulnerability element for the particular consumer. Different consumers may be associated with different vulnerability factors. In an embodiment, a CP search directive is to minimize a maximum of the per-consumer vulnerability costs. In another embodiment, a CP search directive is to minimize an average of the per-consumer vulnerability costs. In another embodiment, a CP search directive is to minimize a sum of the per-consumer vulnerability costs (that is, to minimize a total vulnerability cost for the computing system).

One or more embodiments include applying a CP data model and a CP search directive to a CP solver to obtain resource allocation limitations. A resource manager obtains updated resource limits and/or resource guarantees from the CP solver. Based on a resource guarantee for a particular consumer, the resource manager designates resources to the particular consumer; the number of designated resources is equal to the resource guarantee. The resource manager disallows other consumers from using the designated resources. Further, based on a resource guarantee and/or a resource limit for a particular consumer, the resource manager queues or assigns a new process request made by the particular consumer. If the number of the particular consumer's pending process requests is equal to or below the resource guarantee, then the new process request may be preferentially assigned to a designated resource. If the number of pending process requests exceeds the resource limit, then the new process request is added to a queue of the particular consumer; hence the resource manager ensures that process requests being assigned to resources are within the resource limit. If the number of pending process requests is above the resource guarantee and equal to or below the resource limit, then a process request removed from the particular consumer's queue (or, if there is no queue, the new process request itself) may be assigned to a particular resource. The resource manager may interrupt an ongoing execution of a process request made by another consumer on the particular resource in order to assign the particular resource to the particular consumer's process request.

The choice of using exceedance distributions to model the resource allocation problem enables a CP solver to efficiently determine an optimized solution. Volumes of data embodied in historical resource usage logs are compacted into exceedance distributions, which logically correspond neatly to the guarantee limits via an element constraint. Further, the use of exceedance distributions and the related element constraint allow a CP solver to seek an optimized solution without requirements on the shape of an objective function, performing derivatives of an objective function, and/or providing an initial estimate on the CP solution.

The CP data model and the CP search directive allow a CP solver to efficiently determine updated resource allocation limitations based on recent resource usage data. Continual updates to resource allocation limitations allows the computing system to quickly adapt to changing resource usage patterns. Optimal resource allocation limitations reduce the likelihood of vulnerability occurrences of consumers, and/or underutilized resources.

One or more embodiments described in this Specification and/or recited in the claims may not be included in this General Overview section.

2. Computing System Architecture

FIG. 1 illustrates a resource manager managing a computing system, in accordance with one or more embodiments. As illustrated in FIG. 1, a system 100 includes a resource manager 110, a data repository 102, a set of consumers 112, a set of resources 116, and a constraint programming (CP) solver 118. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, consumers 112 refers to hardware and/or software that generate workload for resources 116. Examples of consumers 112 include database instances, virtual machines, and/or hardware servers. Workload generated by consumers 112 may be measured by a variety of units, such as, a number of process requests, a volume of data to be communicated and/or stored, and/or a duration of processing time.

In one or more embodiments, resources 116 refers to hardware and/or software that serve and/or process workload generated by consumers 112. Examples of resources 116 include central processing units (CPUs), disk memory, and/or communication bandwidth.

In one or more embodiments, a resource manager 110 refers to hardware and/or software configured to allocate resources 116 to consumers 112. Allocation refers to assigning resources 116 to requests of consumers 112, such that a resource assigned to a request serves and/or processes the request. Additionally or alternatively, allocation refers to designating resources 116 to consumers 112, such that a resource designated for a consumer cannot serve requests of other consumers.

In an embodiment, a resource manager 110 performs allocation decisions based on consumer configurations 104, including resource limits 106 and/or resource guarantees 108. A resource limit 106 is a maximum number of resources 116 that may be assigned to a consumer 112 at any given time. A resource guarantee 108 is a minimum number of resources 116 that are guaranteed for a consumer 112 at any given time. Examples of operations for applying resource limits 106 and/or resource guarantees 108 are further described below with reference to FIGS. 7-8.

Different consumer configurations 104 may correspond to different consumers 112. For example, one set of consumer configurations may correspond to consumer 112a, while a different set of consumer configurations may correspond to consumer 112b.

In one or more embodiments, a data repository 102 is any type of storage unit and/or device (e.g., a file system, database, collection of tables, or any other storage mechanism) for storing data. Further, a data repository 102 may include multiple different storage units and/or devices. The multiple different storage units and/or devices may or may not be of the same type or located at the same physical site. Further, a data repository 102 may be implemented or may execute on the same computing system as a resource manager 110. Alternatively or additionally, a data repository 102 may be implemented or executed on a computing system separate from a resource manager 110. The data repository 102 may be communicatively coupled to the resource manager 110 via a direct connection or via a network. Information describing consumer configurations 104 may be implemented across any of components within the system 100. However, this information is illustrated within the data repository 102 for purposes of clarity and explanation.

In one or more embodiments, a CP solver 118 refers to hardware and/or software configured to determine a CP solution given a CP data model 232 and a CP search directive 234. Further embodiments and/or examples of a CP solver 118 are described below with reference to FIGS. 2A-2B.

Figure 2A:
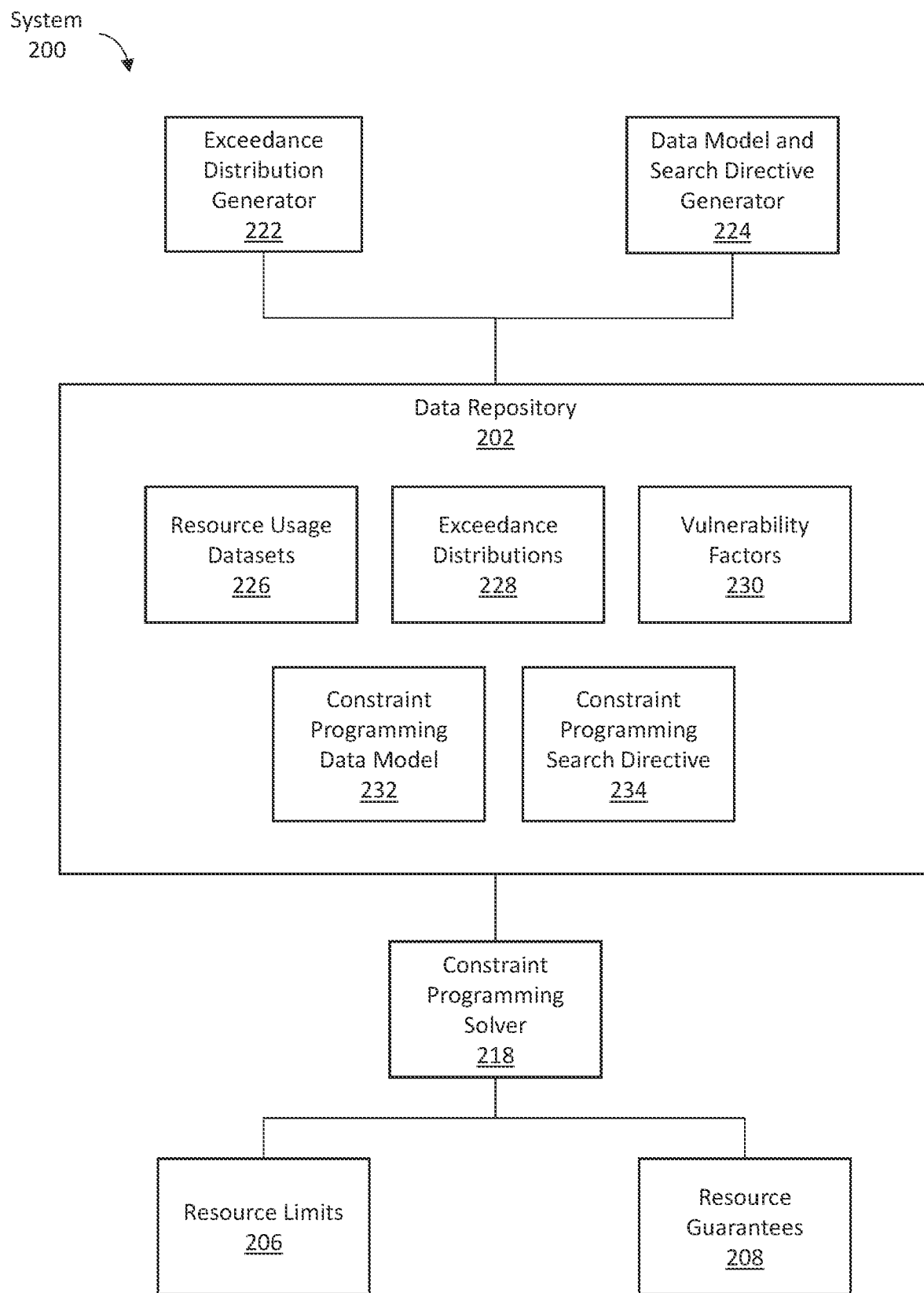
FIGS. 2A-2B illustrate a constraint programming data model and search directive generation system, in accordance with one or more embodiments.

In one or more embodiments, system 100 of FIG. 1 and system 200 of FIG. 2A may be combined into a single system configured to manage allocation of resources 116 to consumers 112. CP solver 118 of FIG. 1 is equivalent to CP solver 218 of FIG. 2A. Resource limits 106 and resource guarantees 108 of FIG. 1 (used by resource manager 110) are equivalent to resource limits 206 and resource guarantees 208 of FIG. 2A (output by CP solver 218), respectively.

Figure 2B:
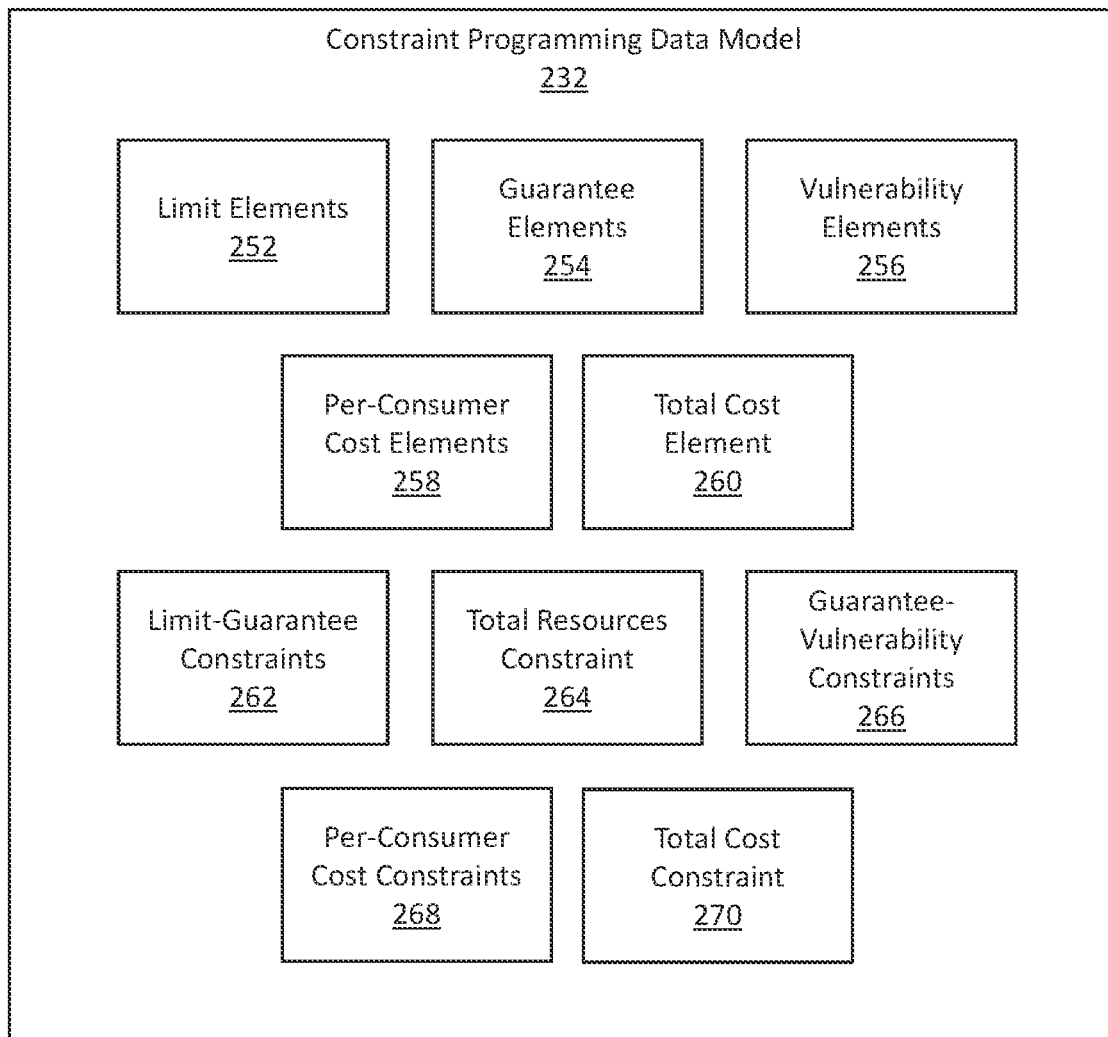

3. Constraint Programming Data Model and Search Directive Generation System Architecture FIGS. 2A-2B illustrate a constraint programming data model and search directive generation system, in accordance with one or more embodiments. As illustrated in FIG. 2A, a system 200 includes an exceedance distribution generator 222, a model and directive generator 224, a data repository 202, a CP solver 218, resource limits 206, and resource guarantees 208. In one or more embodiments, the system 200 may include more or fewer components than the components illustrated in FIG. 2A. The components illustrated in FIG. 2A may be local to or remote from each other. The components illustrated in FIG. 2A may be implemented in software and/or hardware. Each component may be distributed over multiple applications and/or machines. Multiple components may be combined into one application and/or machine. Operations described with respect to one component may instead be performed by another component. As discussed above, system 100 of FIG. 1 and system 200 of FIG. 2A may be combined into a single system configured to allocate resources to consumers.

In one or more embodiments, a data repository 202 is any type of storage unit and/or device (e.g., a file system, database, collection of tables, or any other storage mechanism) for storing data. Further, a data repository 202 may include multiple different storage units and/or devices. The multiple different storage units and/or devices may or may not be of the same type or located at the same physical site. Further, a data repository 202 may be implemented or may execute on the same computing system as an exceedance distribution generator 222, model and directive generator 224, and/or CP solver 218. Alternatively or additionally, a data repository 202 may be implemented or executed on a computing system separate from an exceedance distribution generator 222, model and directive generator 224, and/or CP solver 218. The data repository 202 may be communicatively coupled to the exceedance distribution generator 222, model and directive generator 224, and/or CP solver 218 via a direct connection or via a network.

Information describing resource usage datasets 226, exceedance distributions 228, vulnerability factors 230, CP data model 232, and/or CP search directive 234 may be implemented across any of components within the system 200. However, this information is illustrated within the data repository 202 for purposes of clarity and explanation.

In one or more embodiments, a resource usage dataset 226 of a particular consumer includes datapoints indicating an amount of resources used by the particular consumer over a time period. A resource usage dataset 226 may be stored in the form of a log, spreadsheet, and/or any other format. Resource usage may be measured in terms of count (such as a count of CPUs used), volume (such as a volume of memory space used), time (such as a duration in which a communication channel is used), and/or other units. Resource usage datasets 226 may include datapoints at certain time intervals, which may be fixed and/or varying. Each datapoint is an actual measurement and/or aggregated measurement. An actual measurement is an actual measured resource usage at a given point in time. An aggregated measurement refers to a result of some manipulation (such as, a sum or average) of actual measurements over a time window. As an example, a monitoring agent may detect an actual number of CPUs being used every second. Starting at time=0 seconds and ending at time=9 seconds, the actual measurements of CPU usage may be 2, 3, 4, 4, 4, 2, 3, 4, 5, 6. The monitoring agent may determine a running average of the number of CPUs being used every 3 seconds. At time=2, the average is computed based on the actual measurements at time=0, time=1, and time=2. Hence starting at time=2 and ending at time=9 seconds, the average CPU usages may be 3.00, 3.67, 4.00, 3.33, 3.00, 3.00, 4.00, 5:00. The monitoring agent may report the average CPU usages as "aggregated measurements."

In one or more embodiments, an exceedance distribution 228 indicates counts of datapoints indicating that resource usage of a particular consumer exceeds critical values, wherein the critical values range from zero to a total number of resources in the computing system. The counts of such datapoints are based on a resource usage dataset 226 of the particular consumer over a given historical time period.

As an example, a resource usage dataset may include the following datapoints:
Jan. 1, 2021, at 10:00 am: 2 CPUs;
Jan. 1, 2021, at 10:01 am: 3 CPUs;
Jan. 1, 2021, at 10:02 am: 4 CPUs;
Jan. 1, 2021, at 10:03 am: 4 CPUs;
Jan. 1, 2021, at 10:04 am: 4 CPUs;
Jan. 1, 2021, at 10:05 am: 2 CPUs;
Jan. 1, 2021, at 10:06 am: 3 CPUs;
Jan. 1, 2021, at 10:07 am: 4 CPUs;
Jan. 1, 2021, at 10:08 am: 5 CPUs;
Jan. 1, 2021, at 10:09 am: 6 CPUs.

An exceedance distribution for the resource usage dataset from 10:00 am to 10:09 am on Jan. 1, 2021, would thus indicate:
Critical value 0: 10 datapoints exceeding the critical value;
Critical value 1: 10 datapoints exceeding the critical value;
Critical value 2: 8 datapoints exceeding the critical value;
Critical value 3: 6 datapoints exceeding the critical value;
Critical value 4: 2 datapoints exceeding the critical value;
Critical value 5: 1 datapoints exceeding the critical value;
Critical value 6: 0 datapoints exceeding the critical value.

The exceedance distribution would omit information greater than the minimal critical value (that is, 6) associated with no exceedances. Omission of such information is acceptable since zero datapoints exceeding the critical value of 6 necessarily means zero datapoints exceeding the critical values of 7, 8, 9, 10. Additionally or alternatively, omission of such information is desired in order to ensure that a resource guarantee is equal to or smaller than the minimal critical value associated with no exceedances.

In one or more embodiments, a vulnerability factor 230 indicates a cost factor associated with a vulnerability datapoint of a particular consumer. For example, a consumer associated with non-interruptible workloads may be associated with a higher vulnerability factor than a consumer associated with interruptible workloads. A consumer associated with a higher priority (and/or processes that have higher priority) may be associated with a higher vulnerability factor than a consumer associated with a lower priority. A consumer associated with a higher revenue may be associated with a higher vulnerability factor than a consumer associated with a lower revenue. Where vulnerability factors 230 of all consumers are assumed to be the same, vulnerability factors 230 of all consumers may be expressed as "1."

In one or more embodiments, a CP data model 232 refers to a particular organization, structure, and/or representation of information. A CP data model 232 declaratively expresses combinatorial properties of a problem in terms of constraints. A CP data model 232 may be implemented as a software data structure. The software data structure is readable by a machine. The CP data model 232 may include a set of data and/or instructions readable by one or more devices including a hardware processor. The CP data model 232 may serve as an input parameter into a hardware and/or software component, such as a CP solver 218.

Referring to FIG. 2B, a CP data model 232 includes a set of data model elements; and domains of possible values that can be assigned to each element. A data model element cannot be assigned a value that is not within the domain of the data model element. A data model element may be implemented as an array, a vector, a linked list, a table, a software variable, a constant, and/or other software data structures or data objects.

In an embodiment, a CP data model 232 includes several sets of data model elements. A set of limit elements 252 represents resource limits for the consumers. A domain of each limit element 252 ranges from zero to the total number of resources in the computing system.

A set of guarantee elements 254 represents resource guarantees for the consumers. A domain of each guarantee element 254 ranges from zero to the total number of resources in the computing system.

A set of vulnerability elements 256 represents vulnerability counts for the consumers based on resource usage over a given historical time period. A domain of each vulnerability element 256 ranges from zero to the total number of datapoints for the corresponding consumer within the given historical time period.

As an example, a computing system may include 8 CPUs and 4 database instances. Resource usage logs of each database instance may indicate one datapoint per minute. A time period of interest may be Jan. 1, 2021, from 10:00 am to 10:09 am. Hence there are ten datapoints for each consumer within the time period of interest.

Based on the above set up, a CP data model may have the following data model elements and corresponding domains:
L[0]: {0, 1, 2, 3, 4, 5, 6, 7, 8}
L[1]: {0, 1, 2, 3, 4, 5, 6, 7, 8}
L[2]: {0, 1, 2, 3, 4, 5, 6, 7, 8}
L[3]: {0, 1, 2, 3, 4, 5, 6, 7, 8}
G[0]: {0, 1, 2, 3, 4, 5, 6, 7, 8}
G[1]: {0, 1, 2, 3, 4, 5, 6, 7, 8}
G[2]: {0, 1, 2, 3, 4, 5, 6, 7, 8}
G[3]: {0, 1, 2, 3, 4, 5, 6, 7, 8}
V[0]: {0, 1, 2, 3, 4, 5, 6, 7, 8, 9, 10}
V[1]: {0, 1, 2, 3, 4, 5, 6, 7, 8, 9, 10}
V[2]: {0, 1, 2, 3, 4, 5, 6, 7, 8, 9, 10}
V[3]: {0, 1, 2, 3, 4, 5, 6, 7, 8, 9, 10}
wherein L[i] represents limit elements, G[i] represents guarantee elements, V[i] represents vulnerability elements, and i corresponds to the database instances.

Optionally, a CP data model 232 includes a set of per-consumer cost elements 258. A set of per-consumer cost elements 258 represents respective costs for the consumers resulting from vulnerability over a given historical time period. A per-consumer cost element 258 for a particular consumer represents a product of (a) a vulnerability factor for the particular consumer and (b) a vulnerability count for the particular consumer over the given historical time period. A domain of a per-consumer cost element 258 for a particular consumer includes each product of (a) a vulnerability factor for the particular consumer and (b) each value in the domain of a vulnerability element for the particular consumer.

As an example, a computing system may include 8 CPUs and 4 database instances. Resource usage logs of each database instance may include one datapoint per minute. A time period of interest may be Jan. 1, 2021, from 10:00 am to 10:09 am. Vulnerability factors for the 4 database instances may be 0.9, 0.6, 0.7, and 0.8, respectively.

As discussed above, a CP data model may include the following vulnerability elements:
V[0]: {0, 1, 2, 3, 4, 5, 6, 7, 8, 9, 10}
V[1]: {0, 1, 2, 3, 4, 5, 6, 7, 8, 9, 10}
V[2]: {0, 1, 2, 3, 4, 5, 6, 7, 8, 9, 10}

A domain for a per-consumer cost element for the first database instance CC[0] may include each product of 0.9 and each value in the domain of V[0]. Hence, the CP data model may include the following per-consumer cost elements:
CC[0]: {0.0, 0.9, 1.8, 3.6, 4.5, 5.4, 6.3, 7.2, 8.1, 9.0}
CC[0]: {0.0, 0.6, 1.2, 1.8, 2.4, 3.0, 3.6, 4.2, 4.8, 5.4, 6.0}
CC[0]: {0.0, 0.7, 1.4, 2.1, 2.8, 3.5, 4.2, 4.9, 5.6, 6.3, 7.0}
CC[0]: {0.0, 0.8, 1.6, 2.4, 3.2, 4.0, 4.8, 5.6, 6.4, 7.2, 8.0}.

Optionally, a CP data model 232 includes a total cost element 260. A total cost element 260 represents a total cost for the consumers in the computing system resulting from vulnerability over a given historical time period. A domain of the total cost element 260 indicates possible total cost values for the consumers in the computing system. A minimum value in the domain is zero. A maximum value in the domain is a sum of each product of (a) each vulnerability factor for each consumer and (b) the total number of datapoints for each consumer in the given historical time period.

As an example, a computing system may include 8 CPUs and 4 database instances. Resource usage logs of each database instance may indicate one datapoint per consumer per minute. A time period of interest may be Jan. 1, 2021, from 10:00 am to 10:09 am. Vulnerability factors for the 4 database instances may be 0.9, 0.6, 0.7, and 0.8, respectively. Hence, a maximum value in the domain of a total cost element would be 0.9×10+0.6×10+0.7×10+0.8×10=30.

In an embodiment, a CP data model 232 includes several constraints. A constraint defines combinations of values that are allowed to be assigned to a set of data model elements (such as limit elements 252, guarantee elements 254, and vulnerability elements 256, described above).

A set of limit-guarantee constraints 262 relates the link elements 252 and the guarantee elements 254. A limit-guarantee constraint 262 requires that a guarantee element 254 (of a particular consumer) be equal to a limit element 252 (of the particular consumer) divided by an oversubscription ratio, wherein the oversubscription ratio is equal to a sum of the limit elements 252 divided by a total number of resources. The limit-guarantee constraint 262 may be expressed as:

$$G[i] = \frac{L[i]}{\left(\sum_{c \in Consumers} L[c]\right)/(\text{Total Number of Resources})}$$

wherein L[i] represents a limit element 252, G[i] represents a guarantee element 254, L[c] represents the set of limit elements, and i corresponds to specific consumers in a computing system.

A total resources constraint 264 relates the guarantee elements 254 and a total number of resources in the computing system. The total resources constraint 264 requires that a sum of the guarantee elements 254 be less than or equal to a total number of resources. The total resources constraint 264 may be expressed as:

$$\sum_{c \in Consumers} G[c] \leq \text{Total Number of Resources}$$

wherein G[c] represents a set of guarantee elements 254.

A set of guarantee-vulnerability constraints 266 relates the guarantee elements 254 and the vulnerability elements 256. A guarantee-vulnerability constraint 266 requires that a vulnerability element 256 (of a particular consumer) be equal to a vulnerability count corresponding to a guarantee value assigned (or to-be-assigned) to a guarantee element 254 (for the particular consumer), based on resource usage over a given historical time period.

In an embodiment, the guarantee-vulnerability constraint 266 is expressed as an element constraint. An element constraint accepts as input (a) an index element, and (b) a sequence of values. The index element input serves to index into the sequence of values, such that the element constraint returns a particular value, from the sequence of values, corresponding to a value assigned (or to-be-assigned) to the index element. For the guarantee-vulnerability constraint 266, the index element is the guarantee element 254, and the sequence of values is an exceedance distribution 228. Further, the index element outputs to a vulnerability element 256.

As an example, a CP data model may include the following data model elements:
G[0]: {0, 1, 2, 3, 4, 5, 6, 7, 8}
V[0]: {0, 1, 2, 3, 4, 5, 6, 7, 8, 9, 10} wherein G[0] represent a guarantee element corresponding to a particular consumer, and V[0] represents a vulnerability element corresponding to the same particular consumer.

An exceedance distribution may be: {10, 8, 7, 6, 4, 1, 1, 0}.

A guarantee-vulnerability constraint may be expressed as an element constraint, having (a) G[0] as the input index element, (b) the exceedance distribution as the input sequence of values, and (c) V[0] as the output element. Based on the element constraint, a value of "0" assigned to G[0] maps to "10" of the particular sequence of values; and hence a value of "10" is returned. A value of "1" assigned to G[0] maps to "8" of the particular sequence of values; and hence a value of "8" is returned. A value of "2" assigned to G[0] maps to "7" of the particular sequence of values; and hence a value of "7" is returned. The value returned must be within the domain of V[0].

Optionally, a set of per-consumer cost constraints 268 relates vulnerability factors and vulnerability elements 256 per consumer. A per-consumer cost constraint 268 (for a particular consumer) is a product of (a) a vulnerability factor (for the particular consumer), and (b) a vulnerability element (for the particular consumer). A per-consumer cost constraint 268 may be expressed as:

$$CC[i]=VF[i] \times V[i]$$

wherein CC[i] represents a per-consumer cost element, VF[i] represents a vulnerability factor, V[i] represents a vulnerability element, and i corresponds to consumers in a computing system.

Optionally, a total cost constraint 270 relates vulnerability factors and vulnerability elements 256 across consumers in the computing system. A total cost constraint 270 is a dot product of (a) vulnerability factors and (b) a set of vulnerability elements. The total cost constraint 270 may be expressed as:

$$TC=VF \cdot V$$

wherein TC represents a total cost element, VF represents vulnerability factors of the consumers, and V represents vulnerability elements.

Alternatively, where per-consumer cost elements are used, the total cost constraint 270 may be expressed as:

$$TC=\Sigma CC[c]$$

wherein TC represents a total cost element, CC[c] represents a set of per-consumer cost elements.

Referring back to FIG. 2A, a CP search directive 234 is a directive that guides a CP solver 218 in the process of determining an optimal CP solution given a particular CP data model 232. A CP search directive 234 guides the assignment of a set of values to a set of data model elements that satisfies all constraints, as specified by a CP data model 120. A CP search directive 234 prioritizes the assignment of certain values over other values for one or more data model elements. Different CP search directives 234 for a same CP data model 232 may result in a different CP solution. Additionally or alternatively, different CP search directives 234 for a same CP data model 232 may result in different efficiency levels and/or runtimes for obtaining a CP solution. A CP search directive 234 may be implemented as a software data structure. The CP search directive 234 may include a set of computer-readable instructions. The CP search directive 234 may serve as an input parameter into a hardware and/or software component, such as a CP solver 218.

In an embodiment, a CP search directive 234 specifies an objective function. The objective function is a minimization function associated with vulnerability counts and/or vulnerability costs in the computing system.

A CP search directive 234 may include minimizing a maximum of vulnerability elements 256. Additionally or alternatively, a CP search directive 234 may include minimizing a sum of vulnerability elements 256. Additionally or alternatively, a CP search directive 234 may include minimizing an average (for example, mean, median, or mode) of vulnerability elements 256.

Where vulnerability costs are taken into consideration, a CP search directive 234 may include minimizing a maximum of per-consumer cost elements 258. Additionally or alternatively, a CP search directive 234 may include minimizing a sum of per-consumer cost elements 258 (or a total cost element 260). Additionally or alternatively, a CP search directive 234 may include minimizing an average (for example, mean, median, or mode) of per-consumer cost elements 258. Additional and/or alternative minimization functions may be used.

In one or more embodiments, a model and directive generator 224 refers to hardware and/or software configured to generate a CP data model 232 and/or CP search directive 234. Examples of operations for generating a CP data model 232 are described below with reference to FIG. 4. Examples of operations for generating a CP search directive 234 are described below with reference to FIGS. 5A-5C.

In one or more embodiments, a model and directive generator 224 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

In one or more embodiments, a CP solver 218 refers to hardware and/or software configured to determine a CP solution, given a CP data model 232 and a CP search directive 234, using constraint programming techniques. The CP solution specifies resource limits 206 and/or resource guarantees 208. Constraint programming techniques include, for example, backtracking algorithms, forward-checking algorithms, and constraint propagation. Examples of operations for applying a CP data model 232 and a CP search directive 234 to a CP solver 218 are described below with reference to FIG. 6.

4. Determining and Updating Resource Allocation Limitations

Figure 3:
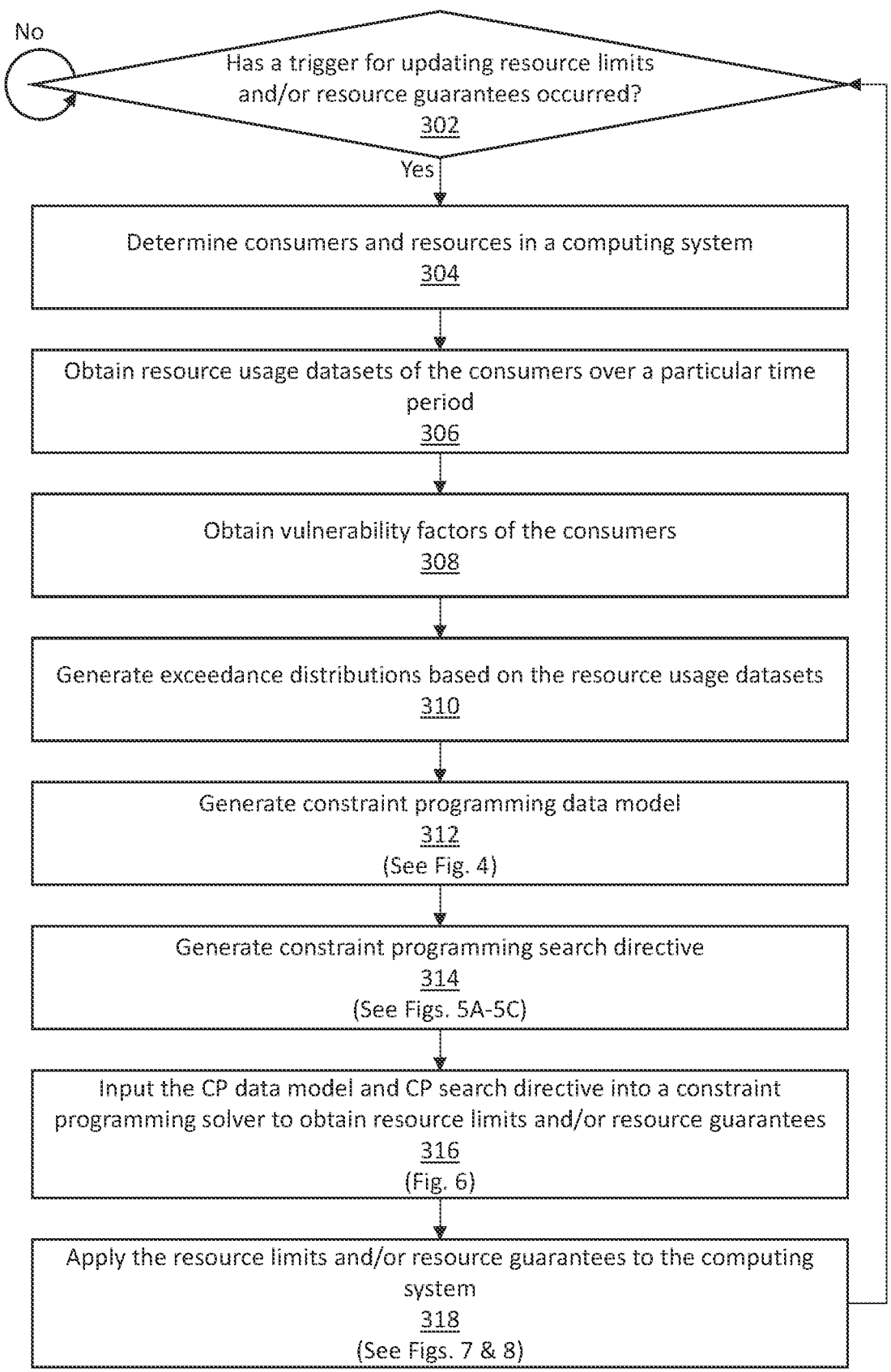
FIG. 3 illustrates an example set of operations for updating resource limits and/or resource guarantees for consumers in a computing system, based on resource usage over a given historical time period, in accordance with one or more embodiments.

One or more operations illustrated in FIG. 3 may be modified, rearranged, and/or omitted all together. Accordingly, the particular sequence of operations illustrated in FIG. 3 should not be construed as limiting the scope of one or more embodiments.

FIG. 3 illustrates an example set of operations for updating resource limits and/or resource guarantees for consumers in a computing system, based on resource usage over a given historical time period, in accordance with one or more embodiments.

One or more embodiments include determining whether a trigger for updating resource limits and/or resource guarantees has occurred (Operation 302). A model and directive generator (such as model and directive generator 224 of FIG.

2A) determines whether a trigger for updating resource limits and/or resource guarantees occurred. A trigger may be based on a schedule. As an example, a schedule may specify that resource limits should be updated every three hours. Additionally or alternatively, a trigger may be based on workloads of one or more consumers in a computing system. As an example, a trigger may be the workload of a consumer exceeding a threshold value. Another trigger may be the total workload of consumers exceeding another threshold value. Additional and/or alternative triggers may be used.

One or more embodiments include determining consumers and resources in a computing system (Operation 304). A tracking system (which may be included in a resource manager 110 of FIG. 1, and/or the model and directive generator) tracks consumers and resources in the computing system via a notification system, a heartbeat system, and/or other approaches. The tracking system stores identities of the consumers and resources in a data repository. The model and directive generator obtains identities of the consumers and resources in the computing system from the data repository.

One or more embodiments include obtaining resource usage datasets of the consumers over a particular time period (Operation 306). A monitoring system (which may be but is not necessarily included in the model and directive generator) monitors resource usage of the consumers. The monitoring system detects, aggregates, measures and/or otherwise obtains resource usage per consumer at a regular time interval, such as, once per second. The monitoring system creates one datapoint per resource usage measurement in a respective resource usage dataset of each consumer. The monitoring system stores the resource usage datasets in a data repository. The model and directive generator obtains the resource usage datasets from the data repository.

In an embodiment, in each iteration for obtaining updated resource limits and/or resource guarantees, the model and directive generator uses resource usage datasets from a most recent historical time period. Hence, a CP data model used for determining resource limits and/or resource guarantees is generated based on the most recent historical usage data. Therefore, the resource limits and/or resource guarantees are adaptively updated based on changing resource usage of the consumers of the computing system.

As an example, resource limits and resource guarantees of a computing system may be updated every hour. In a first iteration at Jan. 1, 2021, 11:00 am, a model and directive generator may generate a CP data model based on resource usage logs from Jan. 1, 2021, 10:00 am to 10:59 am. Hence, resource limits and/or resource guarantees may be determined based on the resource usage data from 10:00 am to 10:59 am. In a second iteration at Jan. 1, 2021, 12:00 pm, the model and directive generator may generate a new CP data model based on resource usage logs from Jan. 1, 2021, 11:00 am to 11:59 am. Hence, resource limits and/or resource guarantees may be determined based on the resource usage data from 11:00 am to 11:59 am. Therefore, resource limits and/or resource guarantees may be continually updated to be most optimal based on the most recent resource usage.

In an embodiment, in each iteration for obtaining updated resource limits and/or resource guarantees, the model and directive generator uses predictions for resource usage for the upcoming time period. Resource usage predictions may be based on (a) resource usage datasets from a most recent historical time period, (b) resource usage datasets from a historical time period sharing a characteristic with the upcoming time period, and/or (c) other factors. A historical time period sharing a characteristic with the upcoming time period may be, for example, a historical time period associated with the same time of day, day of week, and/or day of month as the upcoming time period. Therefore, the resource limits and/or resource guarantees are adaptively updated based on predictions of resource usage of the consumers of the computing system.

One or more embodiments include determining vulnerability factors of the consumers (Operation 308). A user and/or an application specifies vulnerability factors of the consumers. The vulnerability factors are stored in a data repository. The model and directive generator obtains the vulnerability factors from the data repository.

One or more embodiments include generating exceedance distributions based on the resource usage datasets (Operation 310). An exceedance distribution generator (such as exceedance distribution generator 222 of FIG. 2A, which may be but is not necessarily included in the model and directive generator) generates exceedance distributions based on the resource usage datasets.

Initially, the exceedance distribution generator determines a count of datapoints in a resource usage dataset of a particular consumer within a given historical time period. The exceedance distribution generator proceeds with an iterative process, wherein the count of datapoints within the given historical time period is a cap on the number of iterations. The exceedance distribution generator starts with a critical value of zero. The exceedance distribution generator counts a number of datapoints indicating a resource usage above the critical value. The exceedance distribution generator records the count in association with the critical value. The exceedance distribution increments the critical value and iterates the above process. The exceedance distribution generator iterates the above process until the critical value is greater than the count of datapoints within the given historical time period. Hence, the exceedance distribution generator obtains pairs of values, wherein each pair includes a critical value and a count of datapoints indicating a resource usage above the critical value. The pairs of values form an exceedance distribution for the particular consumer. The exceedance distribution generator also iterates the above process with respect to each consumer, to obtain an exceedance distribution for each consumer.

The exceedance distribution generator stores the exceedance distributions of the consumers in a data repository. The model and directive generator obtains the exceedance distributions of the consumers from the data repository.

One or more embodiments include generating a CP data model (Operation 312). The model and directive generator generates a CP data model. Examples of operations for generating a CP data model are further discussed below with reference to FIG. 4.

Figure 5A:
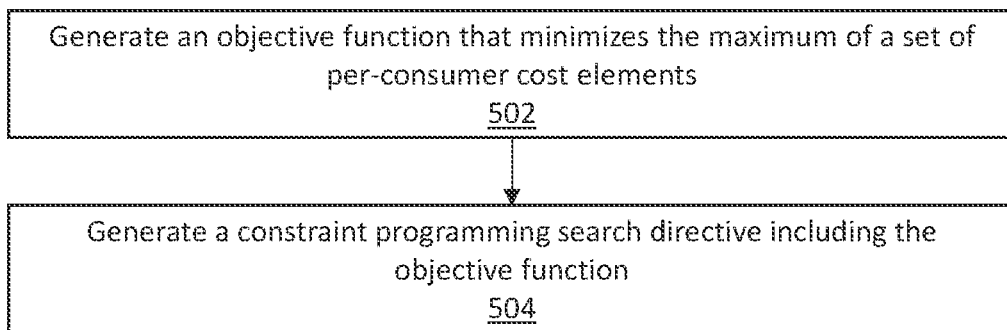
FIGS. 5A-5C illustrate example sets of operations for generating a constraint programming search directive, in accordance with one or more embodiments.
Figure 5B:
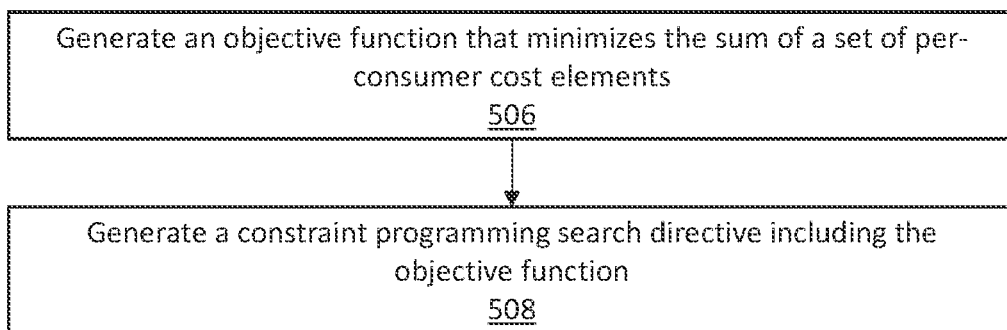
Figure 5C:
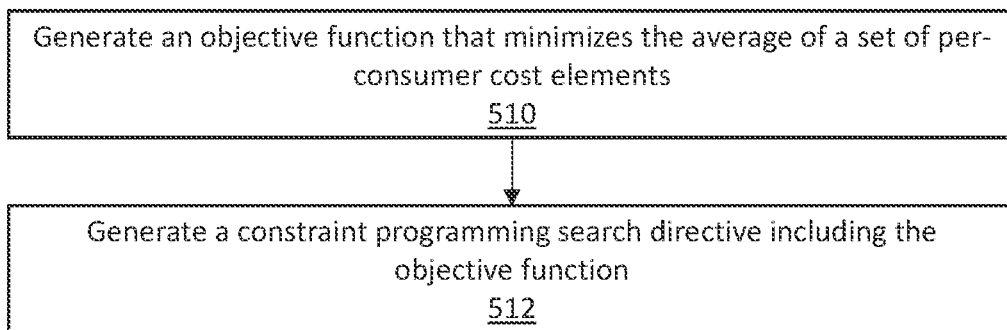

One or more embodiments include generating a CP search directive (Operation 314). The model and directive generator generates a CP search directive. Examples of operations for generating a CP search directive are further discussed below with reference to FIGS. 5A-5C. Each of FIGS. 5A-5C illustrates operations for generating a different, alternative CP search directive. Another CP search directive, not described with reference to FIGS. 5A-5C, may alternatively be used.

One or more embodiments include inputting the CP data model and CP search directive into a CP solver to obtain resource limits and/or resource guarantees (Operation 316). The model and directive generator inputs the CP data model and CP search directive into a CP solver (such as CP solver 218 of FIG. 2A). Examples of operations for applying a CP data model and a CP search directive to a CP solver are further discussed below with reference to FIG. 6.

One or more embodiments include applying the resource limits and/or resource guarantees to the computing system (Operation 318). The CP solver outputs resource limits and/or resource guarantees for the consumers. A resource manager (such as resource manager 110 of FIG. 1) uses the resource limits and/or resource guarantees to manage the computing system. Examples of operations for designating resources to consumers based on resource guarantees is described below with reference to FIG. 7. Examples of operations for queuing process requests exceeding resource limits is described below with reference to FIG. 8.

5. Generating and Applying a Constraint Programming Data Model and Constraint Programming Search Directive to a Constraint Programming Solver One or more operations illustrated in FIGS. 4-6 may be modified, rearranged, and/or omitted all together. Accordingly, the particular sequence of operations illustrated in FIGS. 4-6 should not be construed as limiting the scope of one or more embodiments.

Figure 4:
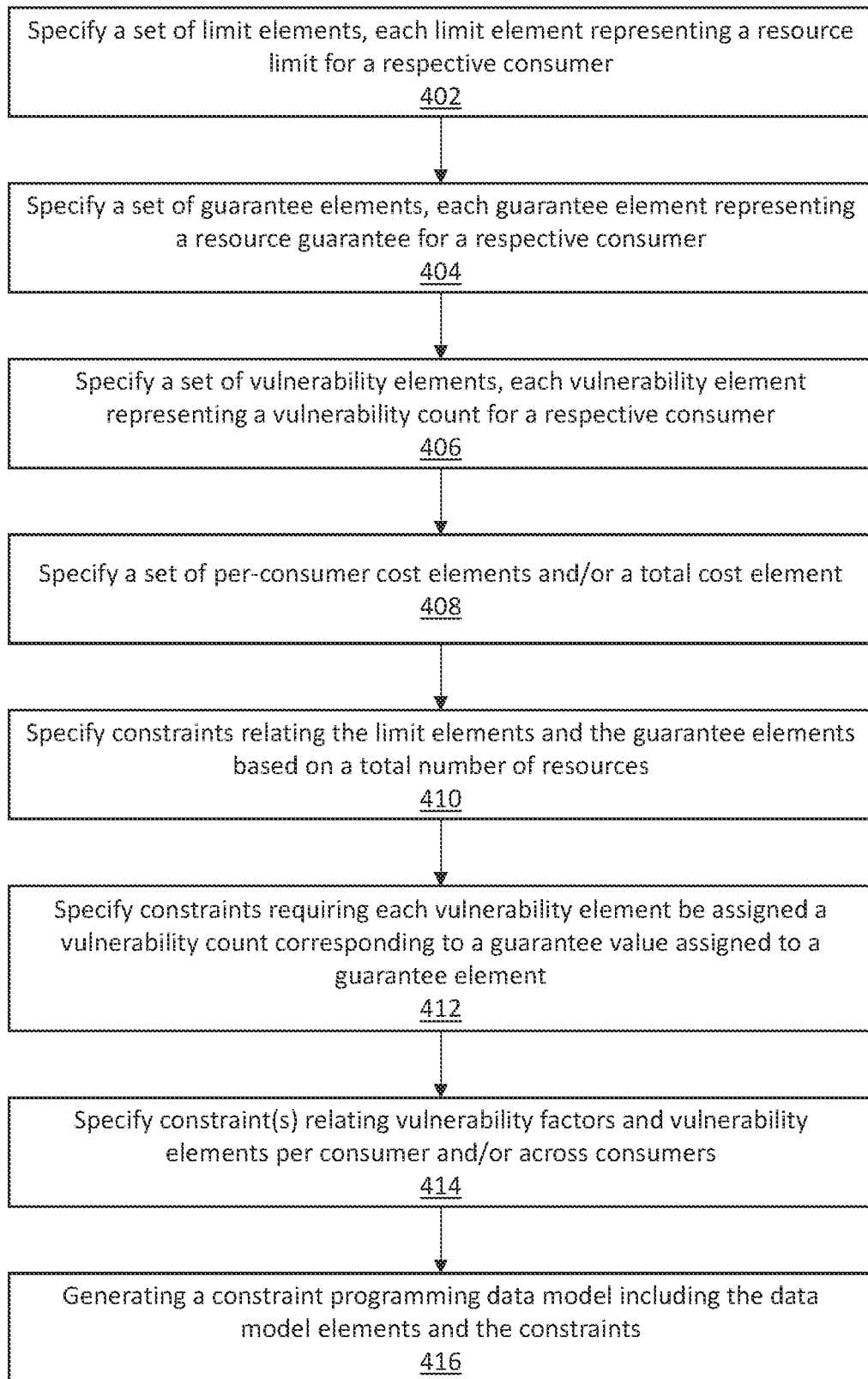
FIG. 4 illustrates an example set of operations for generating a constraint programming data model, in accordance with one or more embodiments.

FIG. 4 illustrates an example set of operations for generating a constraint programming data model, in accordance with one or more embodiments.

One or more embodiments include specifying a set of limit elements, each limit element representing a resource limit for a respective consumer (Operation 402). A model and directive generator (such as model and directive generator 224 of FIG. 2A) specifies a set of limit elements. The set of limit elements may be expressed as a vector, an array, and/or any other data structure. Each limit element represents a resource limit for a respective consumer in a computing system.

Additionally, the model and directive generator specifies domains of the limit elements. Each domain may be expressed as a vector, an array, and/or any other data structure. A domain for each limit element ranges from zero to the total number of resources in the computing system.

One or more embodiments include specifying a set of guarantee elements, each guarantee element representing a resource guarantee for a respective consumer (Operation 404). The model and directive generator specifies a set of guarantee elements. The set of guarantee elements may be expressed as a vector, an array, and/or any other data structure. Each guarantee element represents a resource guarantee for a respective consumer in the computing system.

Additionally, the model and directive generator specifies domains of the guarantee elements. Each domain may be expressed as a vector, an array, and/or any other data structure. A domain for each guarantee element ranges from zero to the total number of resources in the computing system.

One or more embodiments include specifying a set of vulnerability elements, each vulnerability element representing a vulnerability count for a respective consumer (Operation 406). The model and directive generator specifies a set of vulnerability elements. The set of vulnerability elements may be expressed as a vector, an array, and/or any other data structure. Each vulnerability element represents a vulnerability count for a respective consumer in the computing system.

Additionally, the model and directive generator specifies domains of the vulnerability elements. Each domain may be expressed as a vector, an array, and/or any other data structure. A domain for each vulnerability element ranges from zero to the total number of datapoints for the corresponding consumer within the given historical time period.

In an embodiment, a user and/or application may specify certain privileged consumers in the computing system. The user and/or application may specify certain maximums for vulnerability counts of the privileged consumers. The model and directive generator may set the domains of the vulnerability elements for privileged consumers according to the specified maximums. Additionally or alternatively, the user and/or application may specify certain minimums for resource guarantees of the privileged consumers. The model and directive generator may set the domains of the guarantee elements for privileged consumers according to the specified minimums.

As an example, a computing system may include 8 CPUs and 4 database instances. Resource usage logs of each database instance may indicate one datapoint per minute. A time period of interest may be Jan. 1, 2021, from 10:00 am to 10:09 am.

Without any externally specified maximums for vulnerability counts, a set of vulnerability elements may be:

V[0]: {0, 1, 2, 3, 4, 5, 6, 7, 8, 9, 10}
V[1]: {0, 1, 2, 3, 4, 5, 6, 7, 8, 9, 10}
V[2]: {0, 1, 2, 3, 4, 5, 6, 7, 8, 9, 10}
V[3]: {0, 1, 2, 3, 4, 5, 6, 7, 8, 9, 10}.

However, if a user has specified that the first database cannot have any vulnerabilities, then the only vulnerability count allowable for the first database is 0. All values above 0 are removed from the domain of the vulnerability element of the first database. Hence the set of vulnerability elements may become:

V[0]: {0}
V[1]: {0, 1, 2, 3, 4, 5, 6, 7, 8, 9, 10}
V[2]: {0, 1, 2, 3, 4, 5, 6, 7, 8, 9, 10}.

As another example, a computing system may include 8 CPUs and 4 database instances. Resource usage logs of each database instance may indicate one datapoint per minute. A time period of interest may be Jan. 1, 2021, from 10:00 am to 10:09 am.

Without any externally specified minimums for resource guarantees, a set of guarantee elements may be:

G[0]: {0, 1, 2, 3, 4, 5, 6, 7, 8}
G[1]: {0, 1, 2, 3, 4, 5, 6, 7, 8}
G[2]: {0, 1, 2, 3, 4, 5, 6, 7, 8}
G[3]: {0, 1, 2, 3, 4, 5, 6, 7, 8}.

However, if a user specified that the resource guarantee of the first database must be greater than or equal to 4, then 0, 1, 2, 3, are not allowable values for the resource guarantee. Hence 0, 1, 2, 3, are removed from the domain of the guarantee element of the first database. Hence the set of guarantee elements may become:

G[0]: {4, 5, 6, 7, 8}
G[1]: {0, 1, 2, 3, 4, 5, 6, 7, 8}
G[2]: {0, 1, 2, 3, 4, 5, 6, 7, 8}
G[3]: {0, 1, 2, 3, 4, 5, 6, 7, 8}.

As another example, the above two examples may be combined such that both guarantee elements and vulnerability elements are modified by externally specified requirements. Combining the above two examples, a CP data model may include the following guarantee elements and vulnerability elements:

G[0]: {4, 5, 6, 7, 8}
G[1]: {0, 1, 2, 3, 4, 5, 6, 7, 8}
G[2]: {0, 1, 2, 3, 4, 5, 6, 7, 8}
G[3]: {0, 1, 2, 3, 4, 5, 6, 7, 8}
V[0]: {0}
VW: {0, 1, 2, 3, 4, 5, 6, 7, 8, 9, 10}

V[2]: {0, 1, 2, 3, 4, 5, 6, 7, 8, 9, 10}
V[3]: {0, 1, 2, 3, 4, 5, 6, 7, 8, 9, 10}.

One or more embodiments include specifying a set of per-consumer cost elements and/or a total cost element (Operation 408).

Optionally, the model and directive generator specifies a set of per-consumer cost elements. The set of per-consumer cost elements may be expressed as a vector, an array, and/or any other data structure. Each per-consumer cost element represents a vulnerability cost for a respective consumer in the computing system. Additionally, the model and directive generator specifies domains of the per-consumer cost elements. Each domain may be expressed as a vector, an array, and/or any other data structure. A domain of a per-consumer cost element for a particular consumer includes each product of (a) a vulnerability factor for the particular consumer and (b) each value in the domain of a vulnerability element for the particular consumer.

Optionally, the model and directive generator specifies a total cost element. The total cost element represents a total vulnerability cost for the computing system. Additionally, the model and directive generator specifies a domain of the total cost element. The domain may be expressed as a vector, an array, and/or any other data structure. The domain of the total cost element indicates possible total cost values for the consumers in the computing system. A minimum value in the domain is zero. A maximum value in the domain is a sum of each product of (a) each vulnerability factor for each consumer and (b) the total number of datapoints for each consumer in the given historical time period.

One or more embodiments include specifying constraints relating the limit elements and the guarantee elements based on a total number of resources (Operation 410).

The model and directive generator generates a set of limit-guarantee constraints. A limit-guarantee constraint 262 requires that a guarantee element (of a particular consumer) be equal to a limit element (of the particular consumer) divided by an oversubscription ratio, wherein the oversubscription ratio is equal to a sum of the limit elements 252 divided by a total number of resources.

Additionally, the model and directive generator generates a total resources constraint. The total resources constraint 264 requires that a sum of the guarantee elements 254 be less than or equal to a total number of resources.

One or more embodiments include specifying constraints requiring each vulnerability element be assigned a vulnerability count corresponding to a guarantee value assigned to a guarantee element (Operation 412). The model and directive generator generates constraints requiring each vulnerability element be assigned a vulnerability count corresponding to a guarantee value assigned to a guarantee element, based on resource usage over a given historical time period.

The model and directive generator generates an element constraint. The model and directive generator inputs a guarantee element for a particular consumer as an index element to the element constraint. The model and directive generator inputs an exceedance distribution (for example, determined at Operation 310 of FIG. 3) for the particular consumer as a sequence of values to the element constraint. The model and directive generator sets a vulnerability element for the particular consumer as an output element for the element constraint.

The model and directive generator iterates the above process with respect to each consumer, to generate a set of guarantee-vulnerability constraints.

One or more embodiments include specifying one or more constraints relating vulnerability factors and vulnerability elements per consumer and/or across consumers (Operation 414).

Optionally, the model and directive generator generates constraints relating vulnerability factors and vulnerability elements per consumer. The model and directive generator sets a constraint requiring that a per-consumer vulnerability cost element for a particular consumer be equal to a product of (a) a vulnerability factor for the particular consumer and (b) a vulnerability element for the particular consumer. The model and directive generator iterates the above process with respect to each consumer, to obtain a set of per-consumer cost constraints.

Optionally, the model and directive generator generates a constraint relating vulnerability factors and vulnerability elements across consumers of the computing system. The model and directive generator sets a constraint requiring that a total vulnerability cost element be equal to a dot product of (a) vulnerability factors for the consumers and (b) the set of vulnerability elements for the consumers. Alternatively, where per-consumer cost elements are used, the model and directive generator sets a constraint requiring that a total vulnerability cost element be equal to a sum of the per-consumer cost elements for the consumers.

One or more embodiments include generating a CP data model including the data model elements and the constraints (Operation 416). The model and directive generator generates a CP data model. The CP data model includes the limit elements, the guarantee elements, the vulnerability elements, and optionally the per-consumer cost elements and/or the total cost element. The CP data model further includes the limit-guarantee constraints, the total resources constraint, the guarantee-vulnerability constraints, and optionally the per-consumer cost constraints and/or the total cost constraint.

The CP data model may be stored as a software data structure. The CP data model may include one or more arrays, vectors, linked lists, tables, software variables, constants, and/or data objects. The CP data model may include a set of data and/or instructions readable by one or more devices including a hardware processor.

FIGS. 5A-5C illustrate example sets of operations for generating a constraint programming search directive, in accordance with one or more embodiments. Each of FIGS. 5A-5C illustrates operations for generating a different, alternative CP search directive.

Referring to FIG. 5A, one or more embodiments include generating an objective function that minimizes the maximum of a set of per-consumer cost elements (Operation 502). A model and directive generator (such as model and directive generator 224 of FIG. 2A) generates an objective function that minimizes the maximum of a set of per-consumer cost elements. The objective function may be expressed as:

$$\min(\max(CC))$$

wherein CC represents a set of per-consumer cost elements.

One or more embodiments include generating a CP search directive including the objective function (Operation 504). The model and directive generator generates a CP search directive. The CP search directive includes the objective function. The CP search directive may be stored as a software data structure. The CP search directive may include one or more arrays, vectors, linked lists, tables, software variables, constants, and/or data objects. The CP search directive may include a set of instructions executable by one or more devices including a hardware processor.

Referring to FIG. 5B, one or more embodiments include generating an objective function that minimizes the sum of a set of per-consumer cost elements (Operation 506). The model and directive generator generates an objective function that minimizes the sum of a set of per-consumer cost elements. The objective function may be expressed as:

$$\min(\Sigma CC[i])$$

wherein CC[i] represents per-consumer cost elements, and i corresponds to consumers in a computing system.

Alternatively, the objective function may be expressed as:

$$\min(TC)$$

wherein TC represents a total cost element.

One or more embodiments include generating a CP search directive including the objective function (Operation 508). Examples of operations for generating a CP search directive are described above with reference to Operation 504.

Referring to FIG. 5C, one or more embodiments include generating an objective function that minimizes the average of a set of per-consumer cost elements (Operation 510). The model and directive generator generates an objective function that minimizes the average of a set of per-consumer cost elements. The objective function may be expressed as:

$$\min(ave(CC))$$

wherein CC represents a set of per-consumer cost elements.

One or more embodiments include generating a CP search directive including the objective function (Operation 512). Examples of operations for generating a CP search directive are described above with reference to Operation 504.

Figure 6:
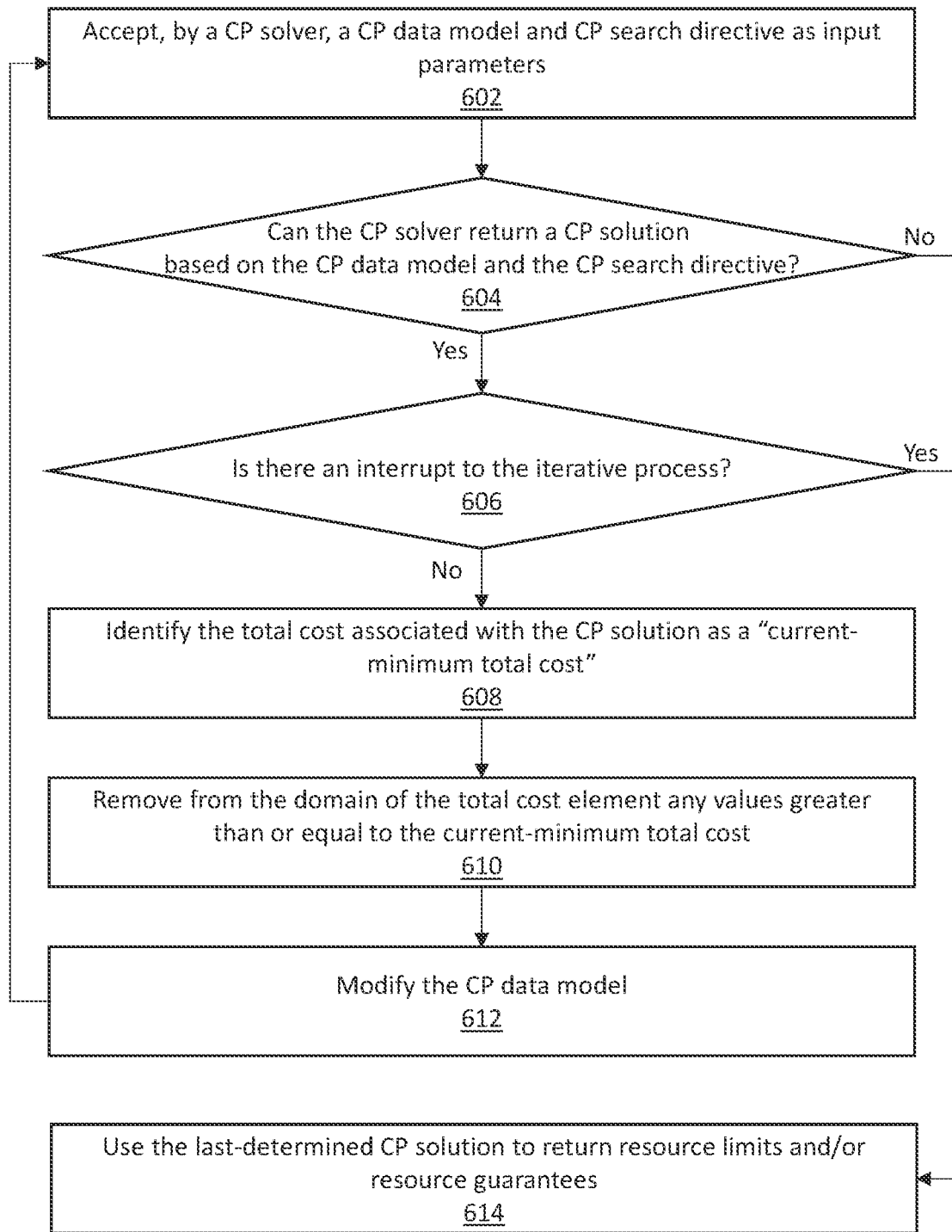
FIG. 6 illustrates an example set of operations for applying a constraint programming data model and a constraint programming search directive to a constraint programming solver, in accordance with one or more embodiments.

FIG. 6 illustrates an example set of operations for applying a constraint programming data model and a constraint programming search directive to a constraint programming solver, in accordance with one or more embodiments. Operations of FIG. 6 assume a CP search directive specifying minimization of a total cost for a computing system. However, modified operations for achieving different CP search directives may be used.

One or more embodiments include accepting, by a CP solver, a CP data model and CP search directive as input parameters (Operation 602). A CP solver (such as CP solver 218 of FIG. 2A) accepts a CP data model and CP search directive as input parameters. Examples of operations for generating the CP data model are described above with reference to FIG. 4. Examples of operations for generating the CP search directive are described above with reference to FIGS. 5A-5C.

One or more embodiments include determining whether the CP solver can return a CP solution based on the CP data model and the CP search directive (Operation 604). The CP solver applies one or more constraint programming techniques to the CP data model, guided by the CP search directive. The CP solver 132 determines a CP solution based on the CP data model and the CP search directive, or determines that no CP solution that satisfies all constraints of the CP data model exists.

Constraint programming techniques include, for example, constraint propagation, backtracking search algorithms, and/or forward-checking algorithms. Constraint propagation involves eliminating inconsistent values from domains of data model elements in a CP data model. Backtracking search algorithms involve incrementally building candidates for a CP solution, including abandoning a candidate as soon as the CP solver determines that the candidate cannot possibly be completed to provide a valid CP solution. Forward-checking algorithms involve attempting to foresee the effect of choosing one candidate over other candidates for a CP solution, or determining a sequence in which to attempt candidates for a CP solution. In an embodiment, the CP solver updates domains of data model elements as the CP solver traverses and assigns values to the data model elements. The CP solver removes values from domains that are no longer possible, given the preliminary assignments made thus far. The CP solver removes values from the domains that would violate any constraints in the CP data model.

As an example, a CP solver may traverse each of a set of limit elements specified by a CP data model to determine a CP solution. The CP solver may begin with a particular limit element. A value from the domain of the particular limit element is preliminarily assigned to the particular limit element. The CP solver then eliminates, from domains of other data model elements of the CP data model, values that are inconsistent with the preliminarily-assigned value for the particular limit element. If this preliminary assignment violates a constraint specified by the CP data model (for example, a domain of another data model element is completely eliminated), then another value from the domain of the particular limit element is preliminarily assigned to the particular limit element. If all values from the domain of the particular limit element are attempted and do not satisfy the constraint, then re-assignment of one or more limit elements previously traversed is performed. In particular, a value from the domain of a previously-traversed limit element was preliminarily assigned to the previously-traversed limit element. Based on the need for re-assignment, another value from the domain of the previously-traversed limit element is now preliminarily assigned to the previously-traversed limit element. Then, assignment of the particular limit element is re-attempted.

Additionally, the CP solver may be guided by an objective function specified by a CP search directive. The CP solver may determine a sequence in which values are attempted for assignment to one or more limit elements and/or guarantee elements based on the CP search directive. If assignment of Value A to a particular limit element is attempted before Value B, and a valid CP solution is found, then the assignment of Value A is finalized, regardless of whether assignment of Value B would have arrived at a valid CP solution. Hence, assignment of Value A is prioritized over Value B.

Hence, the CP solver may traverse each limit element, until each limit element is assigned a limit value from the respective domain, without violating the constraints. The CP solver may determine the preliminary assignments as final assignments. A CP solution may include the final assignments of limit values to limit elements and/or guarantee values to guarantee elements.

Alternatively, the CP solver may traverse each limit element, until assignment of each limit value to the limit elements is attempted, and yet none of the assignments satisfy the constraints. Then, the CP solver may determine that there is no valid CP solution for the CP data model. The CP solver may return a message indicating that no CP solution exists.

If no CP solution is returned, then one or more embodiments include using the last-determined CP solution to return resource limits and/or resource guarantees (Operation 614). Since no CP solution is returned in the current iteration, the CP solver retrieves the CP solution returned in the last iteration. The CP solver identifies the CP solution from the last iteration as the last-determined CP solution. The CP solver also identifies the CP solution from the last iteration as the CP solution satisfying the objective function of the CP search directive. Where the objective function minimizes total cost, the CP solution from the last iteration is the CP solution associated with the lowest total cost (compared to other CP solutions satisfying the constraints of the CP data model). The CP solution specifies limit values assigned to limit elements and/or guarantee values assigned to guarantee elements. The limit values are used as the resource limits for the consumers in the computing system. The guarantee values are used as the resource guarantees for the consumers in the computing system.

If there is no last-determined CP solution (that is, the CP solver is not able to return a CP solution in the first iteration of Operation 602), then the CP solution generates a message indicating that no valid CP solution exists for the provided CP data model.

Conversely, if a CP solution is returned, then one or more embodiments include determining whether an interrupt to the iterative process has been received (Operation 606). As illustrated, Operations 602-612 form an iterative process for finding a CP solution associated with a lowest total cost. A user and/or an application may interrupt the iterative process. As an example, a user may indicate via a user interface that the user desires a best CP solution determined thus far, without waiting for the iterative process to complete.

If an interrupt is received, then one or more embodiments include using the last-determined CP solution to return resource limits and/or resource guarantees (Operation 614). Since a CP solution is returned in the current iteration, the CP solver identifies the CP solution from the current iteration as the last-determined CP solution. Examples of operations for determining resource limits and/or resource guarantees based on a CP solution are provided in the above description of Operation 614.

In an embodiment, an interrupt may be received while the CP solver is in the process of determining a CP solution (at Operations 602-604). The interrupt is received before a CP solution is returned in the current iteration. Hence, the CP solver identifies the CP solution from the last iteration as the last-determined CP solution.

The last-determined CP solution, based on an interrupt, is not necessarily the CP solution associated with the lowest total cost. A request to resume the iterative process for determining the CP solution associated with the lowest total cost may be received. In response to the resumption request, the iterative process may continue at Operation 608.

If an interrupt is not received, then one or more embodiments include identifying the total cost associated with the CP solution as a "current-minimum total cost" (Operation 608). The CP solver identifies the total cost assigned to the total cost element associated with the CP solution obtained at Operation 604 in the current iteration. The total cost is identified as a "current-minimum total cost."

One or more embodiments include removing, from the domain of the total cost element, any values greater than or equal to the current-minimum total cost (Operation 610). The CP solver uses the current-minimum total cost as an upper bound on the possible total cost values to be assigned to the total cost element during a next iteration. The CP solver removes, from the domain of the total cost element, any values greater than or equal to the current-minimum total cost.

As an example, during a current iteration, the CP solver may return a current CP solution. The current CP solution may indicate that the total cost element is assigned with a total cost value of "9." The CP solver may determine "9" as the current-minimum total cost. The CP solver may determine that a current domain of the total cost element is {0, 4, 5, 8, 9, 11, 12}. The CP solver may remove, from the domain of the total cost element, any total cost values greater than or equal to 9. Hence, the CP solver may modify the domain of the total cost element to become {0, 4, 5, 8}.

One or more embodiments include modifying the CP data model (Operation 612). The CP solver modifies the CP data model to include the total cost element with the reduced domain. Based on Operation 610, the domain of the total cost element includes only total cost values that are below the current-minimum total cost.

The CP solver iterates Operations 602-612 with respect to the modified CP data model. At Operation 602, the CP solver accepts the CP data model that has been modified as an input parameter. At Operations 604-608, assuming that the CP solver determines a new CP solution based on the modified CP data model, the CP solver updates the current-minimum total cost. The CP solver identifies a total cost value assigned to the total cost element associated with the new CP solution as the current-minimum total cost. At Operation 610, the CP solver removes, from the domain of the total cost element, any values greater than or equal to the current-minimum total cost value. At Operation 612, the CP solver once again modifies the CP data model. The CP solver continues the iterative process until the CP solver cannot find a CP solution at Operation 604, or an interrupt is received at Operation 606. As described above with reference to Operation 614, when the CP solver cannot find a CP solution at Operation 604, or an interrupt is received at Operation 606, the CP solver uses the last-determined CP solution to return resource limits and/or resource guarantees. If the CP solver completes the iterations without interruption, then the last-determined CP solution is the optimal solution, that is, there are no other solutions with a more minimal cost.

In one or more embodiments, additional and/or alternative operations for applying a constraint programming data model and search directive to a constraint programming solver may be performed, based on different search techniques. Examples of different search techniques are described below.

In an embodiment, before a first application of the CP data model to the CP solver at Operation 602, the CP data model is modified. A particular value within the range of possible total cost values, in the domain of the total cost element, is determined as an initial cutoff value. The initial cutoff value may be, for example, a median of the possible total cost values. All values above the initial cutoff value are removed from the domain of the total cost element. Hence, a first run of the CP solver is required to generate a CP solution with a total cost value below the initial cutoff value. By setting the initial cutoff value, the CP solver may more efficiently arrive at a CP solution with a lower total cost, if a valid CP solution exists.

In an embodiment, the CP solver iterates until all possible CP solutions, for the given CP data model, are found. The CP solver does not modify the domain of the total cost element based on a prior iteration. Hence, the CP solver may find a CP solution with a higher total cost value than a prior CP solution. After determining all possible CP solutions, the CP solver compares the total cost values associated with each possible CP solution. The CP solver then identifies the CP solution with the lowest total cost value.

In an embodiment, multiple CP solutions may be associated with a same lowest total cost. The iterative process may be modified to determine such CP solutions. At Operation 610, remove from the domain of the total cost element any values greater than the current-minimum total cost (but keep any value equal to the current-minimum total cost). At Operation 604, the CP solver attempts to find a CP solution that has not yet been found. If no further CP solutions can be found, then at Operation 614, the set of last-determined CP solutions with the same total cost are identified. One CP solution is selected from the set of last-determined CP solutions with the same total cost. Any selection criteria may be used. As an example, a CP solver may select a CP solution, from the set of last-determined CP solutions with the same total cost, that is associated with resource limits that are most evenly spread across the consumers.

In one or more embodiments, additional and/or alternative operations for applying a constraint programming data model and search directive to a constraint programming solver may be performed, based on different CP search directives. Examples of different CP search directives are described below.

In an embodiment, a CP search directive specifies minimizing a maximum of a set of per-consumer cost elements. Operations 602-606 and 612-614 remain the same. However, Operation 608 is modified to identify the maximum of the set of per-consumer cost elements as a "current minimum maximum per-consumer cost." Operation 610 is modified to remove from the domain of each per-consumer cost element any values greater than or equal to the current minimum maximum per-consumer cost.

In an embodiment, a CP search directive specifies minimizing an average of a set of per-consumer cost elements. The CP data model includes an additional data model element: an average cost element. The average cost element has a domain including possible average costs per consumer in the computing system. The average cost element is required to equal the sum of per-consumer cost elements divided by the total number of consumers. Operations 602-606 and 612-614 remain the same. However, Operation 608 is modified to identify the value of the average cost element as a "current minimum average cost." Operation 610 is modified to remove from the domain of the average cost element any values greater than or equal to the current minimum average cost.

6. Enforcing Resource Guarantees and Resource Limits

Figure 7:
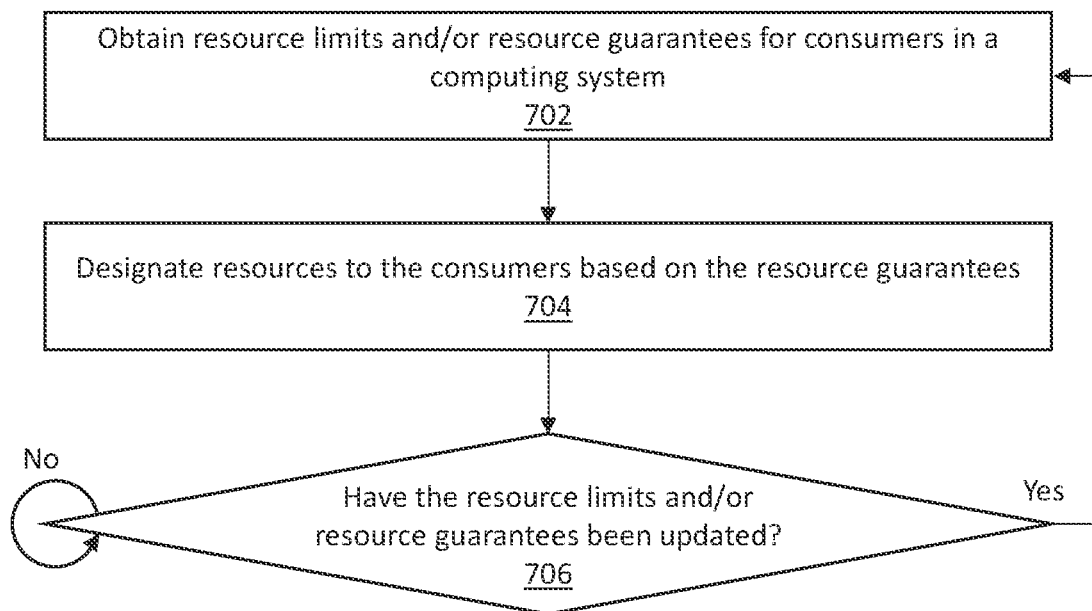
FIG. 7 illustrates an example set of operations for designating resources to consumers based on resource guarantees updated by a constraint programming solver, in accordance with one or more embodiments.
Figure 8:
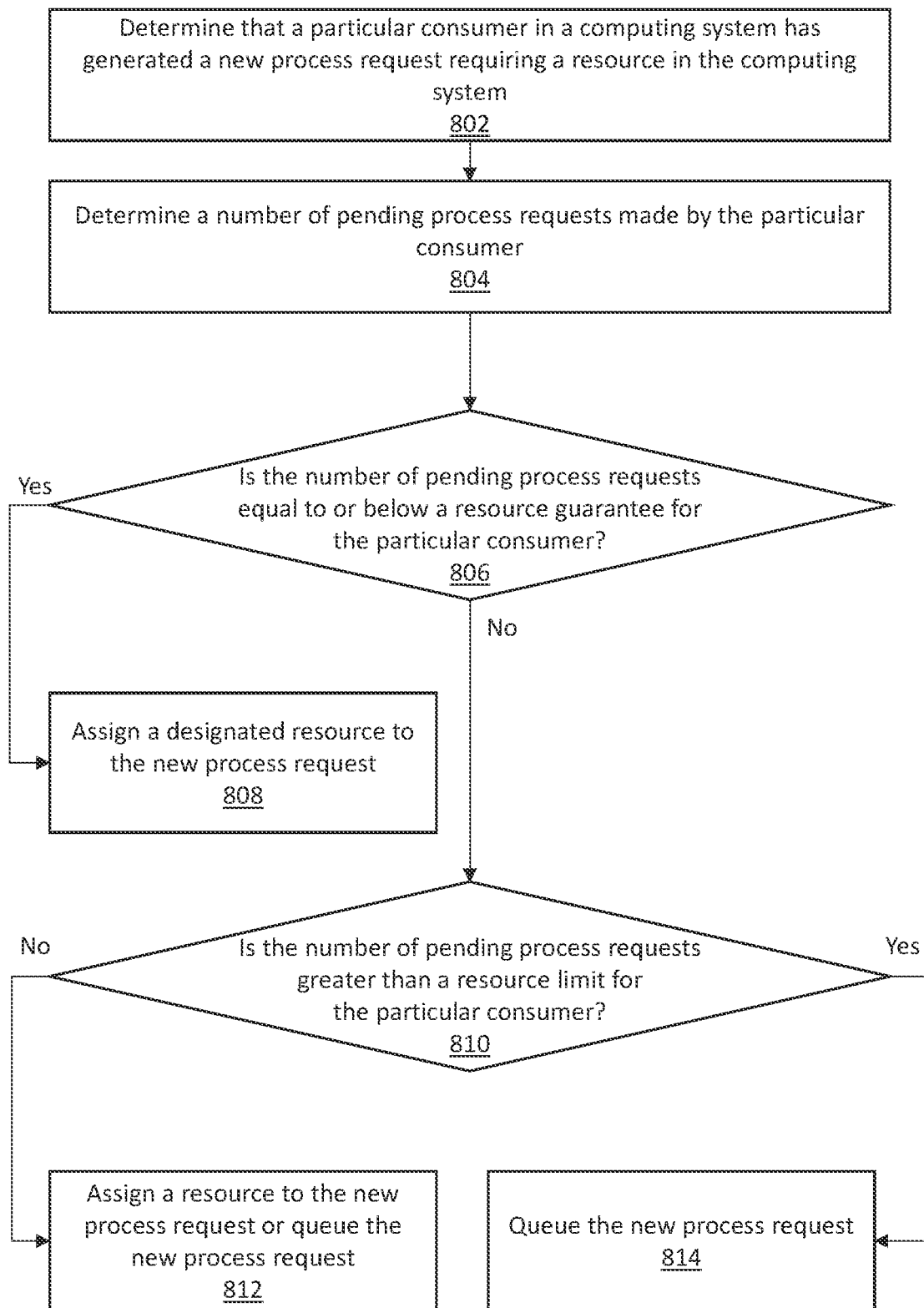
FIG. 8 illustrates an example set of operations for queuing process requests exceeding resource limits updated by a constraint programming solver, in accordance with one or more embodiments.

One or more operations illustrated in FIGS. 7-8 may be modified, rearranged, and/or omitted all together. Accordingly, the particular sequence of operations illustrated in FIGS. 7-8 should not be construed as limiting the scope of one or more embodiments.

FIG. 7 illustrates an example set of operations for designating resources to consumers based on resource guarantees updated by a constraint programming solver, in accordance with one or more embodiments.

One or more embodiments include obtaining resource limits and/or resource guarantees for consumers in a computing system (Operation 702). A resource manager (such as resource manager 110 of FIG. 1) obtains resource limits and/or resource guarantees for consumers in a computing system based on a CP solution determined by a CP solver (such as CP solver 218 of FIG. 2A). Examples of operations for determining a CP solution are described above with reference to FIG. 6, and in particular Operation 614.

One or more embodiments include designating resources to the consumers based on the resource guarantees (Operation 704). The resource manager designates resources to the consumers based on the resource guarantees. In an embodiment, the resource manager designates resources to the consumers based on the resource guarantees determined by the CP solver, without receiving user confirmation for the resource guarantee.

As an example, a computing system may include three database instances, DB1, DB2, and DB3, and eight CPUs, CPU1, CPU2, CPU3, CPU4, CPU5, CPU6, CPU7, and CPU8. A CP solution may specify the following resource guarantees:

For DB1, 2 CPUs;
For DB2, 3 CPUs;
For DB3, 1 CPUs.

Thus, a resource manager may designate two CPUs to DB1; three CPUs to DB2; and one CPU to DB3. Specifically, the resource manager may designate CPU1 and CPU3 to DB1; CPU4, CPU6, and CPU8 to DB2; and CPU2 to DB3. A designated resource is reserved for use by the corresponding consumer and cannot be used by other consumers in the computing system. Therefore a consumer using designated resources is not vulnerable to interruptions caused by the demands of other consumers in the computing system. Meanwhile, CPU5 and CPU7 remain undesignated and available for sharing amongst the database instances.

One or more embodiments include determining whether the resource limits and/or resource guarantees have been updated (Operation 706). The resource manager determines whether the resource limits and/or resource guarantees have been updated. If there has been an update, then the resource manager redetermines resource designations at Operation 704.

FIG. 8 illustrates an example set of operations for queuing process requests exceeding resource limits updated by a constraint programming solver, in accordance with one or more embodiments.

One or more embodiments include determining that a particular consumer in a computing system has generated a new process request requiring a resource in the computing system (Operation 802). A resource manager (such as resource manager 110 of FIG. 1) determines that a particular consumer in a computing system has generated a new process request requiring a resource in the computing system. The particular consumer may have transmitted the new process request to the resource manager for scheduling. Additionally or alternatively, the particular consumer may have transmitted a notification message to the resource manager to inform the resource manager about the new process request.

One or more embodiments include determining a number of pending process requests made by the particular consumer (Operation 804). The resource manager determines a number of process requests (including the new process request) that (a) have been made by the particular consumer and (b) have not yet been completely served.

One or more embodiments include determining whether the number of pending process requests is equal to or below a resource guarantee for the particular consumer (Operation 806). The resource manager determines whether the number of pending process requests is equal to or below a resource guarantee for the particular consumer. In an embodiment, the resource manager uses the resource guarantee determined by the CP solver as a threshold value, without receiving user confirmation for the resource guarantee determined by the CP solver.

If the number of pending process requests is equal to or below the resource guarantee, one or more embodiments include assigning a designated resource to the new process request (Operation 808). The resource manager assigns a resource to the new process request. In an embodiment, a resource manager is set to assign a designated resource whenever possible. Since the number of pending process requests is equal to or below the resource guarantee, at least one designated resource is available. Therefore the resource manager assigns the available dedicated resource to the new process request.

If the number of pending process requests is above the resource guarantee, one or more embodiments including determining whether the number of pending process requests is greater than a resource limit for the particular consumer (Operation 810). The resource manager determines whether the number of pending process requests is greater than a resource limit for the particular consumer. In an embodiment, the resource manager uses the resource limit determined by the CP solver as a threshold value, without receiving user confirmation for the resource limit determined by the CP solver.

If the number of pending process requests is greater than the resource limit, one or more embodiments include queuing the new process request (Operation 814). The resource manager queues the new process request. Resources in the computing system are not assigned to process requests in queue, until the process requests are removed from the queue.

When the number of the particular consumer's process request that are being served falls below the resource limit, the resource manager has the option of removing a process request from the particular consumer's queue. If another resource is available, the resource manager may assign the available resource to the process request removed from the queue. If no resource is available, the resource manager may optionally interrupt a particular resource's ongoing execution of a process request made by another consumer. The resource manager assign the particular resource to the process request removed from the particular consumer's queue. Alternatively, if no resource is available, the resource manager may refrain from interrupting any ongoing execution. Whether to interrupt or not may depend on various factors, examples of which are described below with reference to Operation 812.

If the number of pending process requests is (a) greater than the resource guarantee and (b) less than or equal to the resource limit, one or more embodiments include either assigning a resource to the new process request or queuing the process request (Operation 812). If at least one resource is available, and the particular consumer's queue is empty, the resource manager assigns an available resource to the new process request. If at least one resource is available, and the particular consumer's queue is not empty, the resource manager removes a process request from the front of the queue, and assigns an available resource to the process request. The resource manager adds the new process request to the back of the queue.

If no resources are available, the resource manager may assess a variety of factors to determine whether to interrupt an ongoing execution of a process request made by another consumer. Examples of factors include priority levels associated with the new process request made by the particular consumer and other process requests being executed; priority levels associated with the particular consumer and other consumers; duration of time that other process requests have been executed; predicted time remaining for completing executing of other process requests; predicted time for completing executing of the new process request made by the particular consumer. Based on the various factors, the resource manager may interrupt a particular resource's ongoing execution of a process request. The resource manager may assign the particular resource to a process request removed from the particular consumer's queue (or, to the new process request made by the particular consumer if the queue is empty). Alternatively, based on the various factors, the resource manager may queue the new process request and continue to wait before assigning a resource to any process requests made by the particular consumer.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
   obtaining, by a constraint programming (CP) solver, (a) a first CP data model that specifies one or more of resource limits or resource guarantees for a set of resource consumers and (b) a first CP search directive;
   determining, by the CP solver, a first CP solution based on the first CP data model and the first CP search directive;
   determining, by the CP solver, a current-minimum total cost assigned to a total cost element associated with the first CP solution;
   generating, by the CP solver, a modified CP data model comprising a modified domain of the total cost element that excludes any values greater than or equal to the current-minimum total cost;
   iterating over the CP solver, using the modified CP data model, to determine a second CP solution based on the modified CP data model and the first CP search directive;

returning, by the CP solver, one or more of a resource limit or a resource guarantee based on the second CP solution.

2. The one or more non-transitory computer-readable media of claim 1, wherein iterating over the CP solver is performed until all possible CP solutions, based on the first CP data model and the first CP search directive, have been found.

3. The one or more non-transitory computer-readable media of claim 1, the operations further comprising:
obtaining, by the CP solver, a second CP data model and a second CP search directive;
determining, by the CP solver, that no CP solution exists based on the second CP data model and the second CP search directive;
responsive to determining that no CP solution exists: returning, by the CP solver, a last-determined CP solution from a preceding iteration of the CP solver.

4. The one or more non-transitory computer-readable media of claim 1, the operations further comprising:
detecting, by the CP solver, an interrupt condition;
wherein returning the one or more of the resource limit or the resource guarantee is performed responsive to detecting the interrupt condition.

5. The one or more non-transitory computer-readable media of claim 4, wherein detecting the interrupt condition comprises receiving, via a user interface, user input comprising an instruction to interrupt the CP solver.

6. The one or more non-transitory computer-readable media of claim 1, the operations further comprising:
determining that the second CP solution is one of a plurality of CP solutions associated with a same current-minimum total cost;
selecting, from among the plurality of CP solutions associated with the same current-minimum total cost, a CP solution that satisfies one or more selection criteria.

7. The one or more non-transitory computer-readable media of claim 6, wherein selecting the CP solution that satisfies the one or more selection criteria comprises selecting the CP solution that is associated with resource limits that are most evenly spread among the set of resource consumers.

8. A system comprising:
at least one device comprising one or more hardware processors,
the system being configured to perform operations comprising:
obtaining, by a constraint programming (CP) solver, (a) a first CP data model that specifies one or more of resource limits or resource guarantees for a set of resource consumers and (b) a first CP search directive;
determining, by the CP solver, a first CP solution based on the first CP data model and the first CP search directive;
determining, by the CP solver, a current-minimum total cost assigned to a total cost element associated with the first CP solution;
generating, by the CP solver, a modified CP data model comprising a modified domain of the total cost element that excludes any values greater than or equal to the current-minimum total cost;
iterating over the CP solver, using the modified CP data model, to determine a second CP solution based on the modified CP data model and the first CP search directive;
returning, by the CP solver, one or more of a resource limit or a resource guarantee based on the second CP solution.

9. The system of claim 8, wherein iterating over the CP solver is performed until all possible CP solutions, based on the first CP data model and the first CP search directive, have been found.

10. The system of claim 8, the operations further comprising:
obtaining, by the CP solver, a second CP data model and a second CP search directive;
determining, by the CP solver, that no CP solution exists based on the second CP data model and the second CP search directive;
responsive to determining that no CP solution exists: returning, by the CP solver, a last-determined CP solution from a preceding iteration of the CP solver.

11. The system of claim 8, the operations further comprising:
detecting, by the CP solver, an interrupt condition;
wherein returning the one or more of the resource limit or the resource guarantee is performed responsive to detecting the interrupt condition.

12. The system of claim 11, wherein detecting the interrupt condition comprises receiving, via a user interface, user input comprising an instruction to interrupt the CP solver.

13. The system of claim 8, the operations further comprising:
determining that the second CP solution is one of a plurality of CP solutions associated with a same current-minimum total cost;
selecting, from among the plurality of CP solutions associated with the same current-minimum total cost, a CP solution that satisfies one or more selection criteria.

14. The system of claim 13, wherein selecting the CP solution that satisfies the one or more selection criteria comprises selecting the CP solution that is associated with resource limits that are most evenly spread among the set of resource consumers.

15. A method comprising:
obtaining, by a constraint programming (CP) solver, (a) a first CP data model that specifies one or more of resource limits or resource guarantees for a set of resource consumers and (b) a first CP search directive;
determining, by the CP solver, a first CP solution based on the first CP data model and the first CP search directive;
determining, by the CP solver, a current-minimum total cost assigned to a total cost element associated with the first CP solution;
generating, by the CP solver, a modified CP data model comprising a modified domain of the total cost element that excludes any values greater than or equal to the current-minimum total cost;
iterating over the CP solver, using the modified CP data model, to determine a second CP solution based on the modified CP data model and the first CP search directive;
returning, by the CP solver, one or more of a resource limit or a resource guarantee based on the second CP solution;
wherein the method is performed by at least device comprising one or more hardware processors.

16. The method of claim 15, wherein iterating over the CP solver is performed until all possible CP solutions, based on the first CP data model and the first CP search directive, have been found.

17. The method of claim 15, further comprising:
obtaining, by the CP solver, a second CP data model and a second CP search directive;
determining, by the CP solver, that no CP solution exists based on the second CP data model and the second CP search directive;
responsive to determining that no CP solution exists: returning, by the CP solver, a last-determined CP solution from a preceding iteration of the CP solver.

18. The method of claim 15, further comprising:
detecting, by the CP solver, an interrupt condition;
wherein returning the one or more of the resource limit or the resource guarantee is performed responsive to detecting the interrupt condition.

19. The method of claim 18, wherein detecting the interrupt condition comprises receiving, via a user interface, user input comprising an instruction to interrupt the CP solver.

20. The method of claim 15, further comprising:
determining that the second CP solution is one of a plurality of CP solutions associated with a same current-minimum total cost;
selecting, from among the plurality of CP solutions associated with the same current-minimum total cost, a CP solution that satisfies one or more selection criteria.

* * * * *

UNITED STATES PATENT AND TRADEMARK OFFICE
CERTIFICATE OF CORRECTION

PATENT NO. : 11,876,728 B2
APPLICATION NO. : 18/068662
DATED : January 16, 2024
INVENTOR(S) : Colena et al.

It is certified that error appears in the above-identified patent and that said Letters Patent is hereby corrected as shown below:

On the Title Page

Column 2, under item (56) Other Publications, Line 2, delete "Retreived" and insert -- Retrieved --, therefor.

In the Specification

In Column 9, Line 44, below "V[2]: {0, 1, 2, 3, 4, 5, 6, 7, 8, 9, 10}" insert -- V[3]: {0, 1, 2, 3, 4, 5, 6, 7, 8, 9, 10}. --, therefor.

In Column 16, Line 34, delete "V[2]: {0, 1, 2, 3, 4, 5, 6, 7, 8, 9, 10}." and insert -- V[2]: {0, 1, 2, 3, 4, 5, 6, 7, 8, 9, 10} V[3]: {0, 1, 2, 3, 4, 5, 6, 7, 8, 9, 10}. --, therefor.

In Column 16, Line 67, delete "VW:" and insert -- V[1]: --, therefor.

Signed and Sealed this
Seventh Day of May, 2024

Katherine Kelly Vidal
*Director of the United States Patent and Trademark Office*